(12) United States Patent
Philyaw

(10) Patent No.: US 7,379,901 B1
(45) Date of Patent: May 27, 2008

(54) ACCESSING A VENDOR WEB SITE USING PERSONAL ACCOUNT INFORMATION RETRIEVED FROM A CREDIT CARD COMPANY WEB SITE

(75) Inventor: Jeffry Jovan Philyaw, Dallas, TX (US)

(73) Assignee: LV Partners, L.P., Dallas, TX (US)

( * ) Notice: Subject to any disclaimer, the term of this patent is extended or adjusted under 35 U.S.C. 154(b) by 347 days.

(21) Appl. No.: 09/659,170

(22) Filed: Sep. 11, 2000

Related U.S. Application Data

(63) Continuation-in-part of application No. 09/382,422, filed on Aug. 24, 1999, now abandoned, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, which is a continuation-in-part of application No. 09/151,530, filed on Sep. 11, 1998, now Pat. No. 6,098,106.

(51) Int. Cl.
*G06Q 30/00* (2006.01)
(52) U.S. Cl. .................... 705/26; 705/39; 705/27
(58) Field of Classification Search ............. 705/26, 705/27, 39
See application file for complete search history.

(56) References Cited

U.S. PATENT DOCUMENTS

| | | | |
|---|---|---|---|
| 3,668,312 A | 6/1972 | Yamamoto et al. | 348/17 |
| 4,002,886 A | 1/1977 | Sundelin | 235/61.7 R |
| 4,042,792 A | 8/1977 | Pakenham et al. | 179/90 |
| 4,365,148 A | 12/1982 | Whitney | 235/383 |

(Continued)

FOREIGN PATENT DOCUMENTS

EP  0 927 945 A2  7/1999

(Continued)

OTHER PUBLICATIONS

Morrison, Tina-marie, Visa sets up website to encourage online buyers, Dominion, New Zealand, dated Aug. 24, 2000.*

*Primary Examiner*—Mark Fadok
(74) *Attorney, Agent, or Firm*—Howison & Arnott, L.L.P.

(57) ABSTRACT

A method of accessing a vendor web site (3422) over a global communication packet-switched network (306) using personal account information of a credit card (3400) retrieved from a credit card company server (3300) on the network (306). At a user location disposed on the network, a machine-resolvable code (MRC) (3402) of the credit card (3400) of a user is read with a reading device (3410). Coded information is extracted from the MRC (3402). Routing information associated with the coded information is obtained, which routing information corresponds to the personal account information of the user stored on a credit card company server (3300) disposed on the network (306). The user location connects to the credit card company server (3300) across the network (306) in accordance with the routing information. The personal account information is returned from the credit card company server (3300) to the user location. The personal account information is then presented to the user at the user location. A hyperlink to a vendor web site (3422) is provided in the personal account information. Web site information of the vendor web site (3422) is displayed in response to the user selecting the hyperlink.

20 Claims, 22 Drawing Sheets

U.S. PATENT DOCUMENTS

| | | | |
|---|---|---|---|
| 4,621,259 A | 11/1986 | Schepers et al. | 345/180 |
| 4,654,482 A | 3/1987 | DeAngelis | 379/95 |
| 4,780,599 A | 10/1988 | Baus | 235/383 |
| 4,785,296 A | 11/1988 | Tabata et al. | 340/731 |
| 4,816,904 A | 3/1989 | McKenna et al. | 348/13 |
| 4,817,136 A | 3/1989 | Rhoads | 379/375 |
| 4,833,308 A | 5/1989 | Humble | 235/383 |
| 4,841,132 A | 6/1989 | Kajitani et al. | 235/472 |
| 4,845,634 A | 7/1989 | Vitek et al. | 364/468 |
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,937,853 A | 6/1990 | Brule et al. | 379/91 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,984,155 A | 1/1991 | Geier et al. | 364/401 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,761,648 A | 6/1998 | Golden et al. | 705/14 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,903,721 A | 5/1999 | Sixtus | 395/187.01 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,913,210 A | 6/1999 | Call | 707/4 |
| 5,915,090 A | 6/1999 | Joseph et al. | 709/202 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,948,061 A | 9/1999 | Merriman et al. | 709/219 |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,003,073 A | 12/1999 | Solvason | 709/219 |
| 6,006,257 A | 12/1999 | Slezak | 709/219 |
| 6,009,410 A | 12/1999 | LeMole et al. | 709/219 |
| 6,009,465 A | 12/1999 | Decker et al. | 709/219 |
| 6,012,102 A | 1/2000 | Shachar | 710/5 |
| 6,018,764 A | 1/2000 | Field et al. | 709/217 |
| 6,049,539 A | 4/2000 | Lee et al. | 370/355 |
| 6,064,979 A | 5/2000 | Perkowski | 705/26 |
| 6,108,656 A | 8/2000 | Durst et al. | 707/10 |

| | | | | | | |
|---|---|---|---|---|---|---|
| | 6,327,574 B1 * | 12/2001 | Kramer et al. ................. 705/14 | WO | WO 97/37319 | 2/1997 |
| | | | | WO | WO 98/09243 | 8/1997 |
| | FOREIGN PATENT DOCUMENTS | | | WO | WO 98/03923 | 1/1998 |
| | | | | WO | WO 98/06055 | 2/1998 |
| EP | 0 961 250 A2 | 12/1999 | | WO | WO 98/19259 | 5/1998 |
| JP | 10188140 A | 12/1996 | | WO | WO 98/40823 | 9/1998 |
| WO | WO 93/14476 | 7/1993 | | WO | WO 99/63457 | 6/1999 |
| WO | WO 95/10813 | 10/1994 | | | | |
| WO | WO 96/07146 | 9/1995 | | * cited by examiner | | |

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

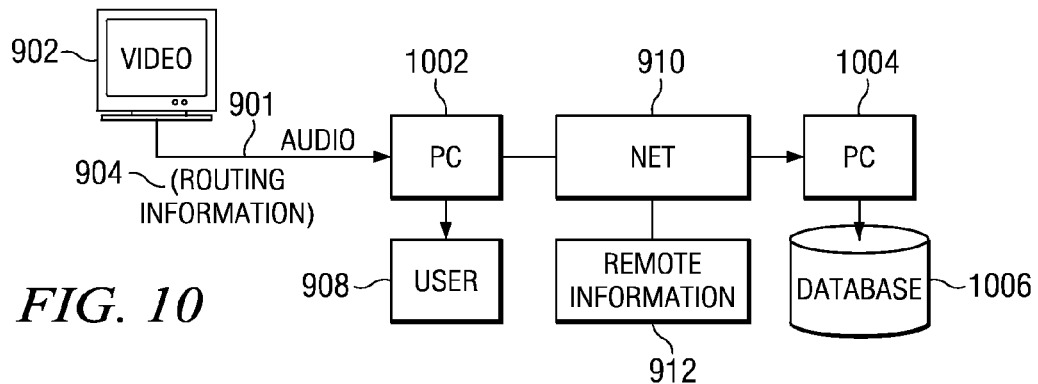
FIG. 10
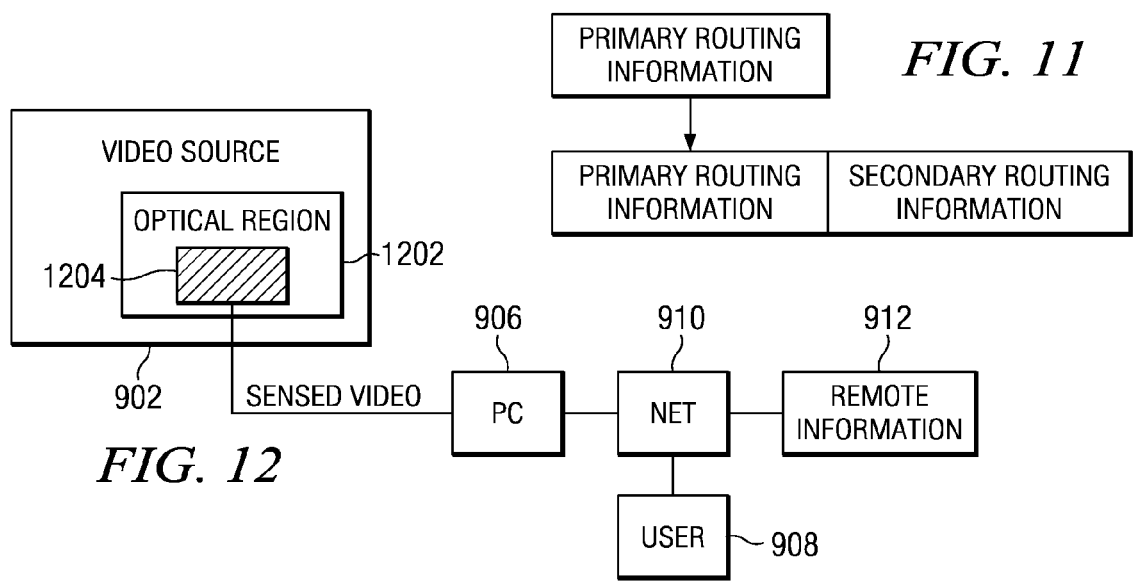
FIG. 11
FIG. 12
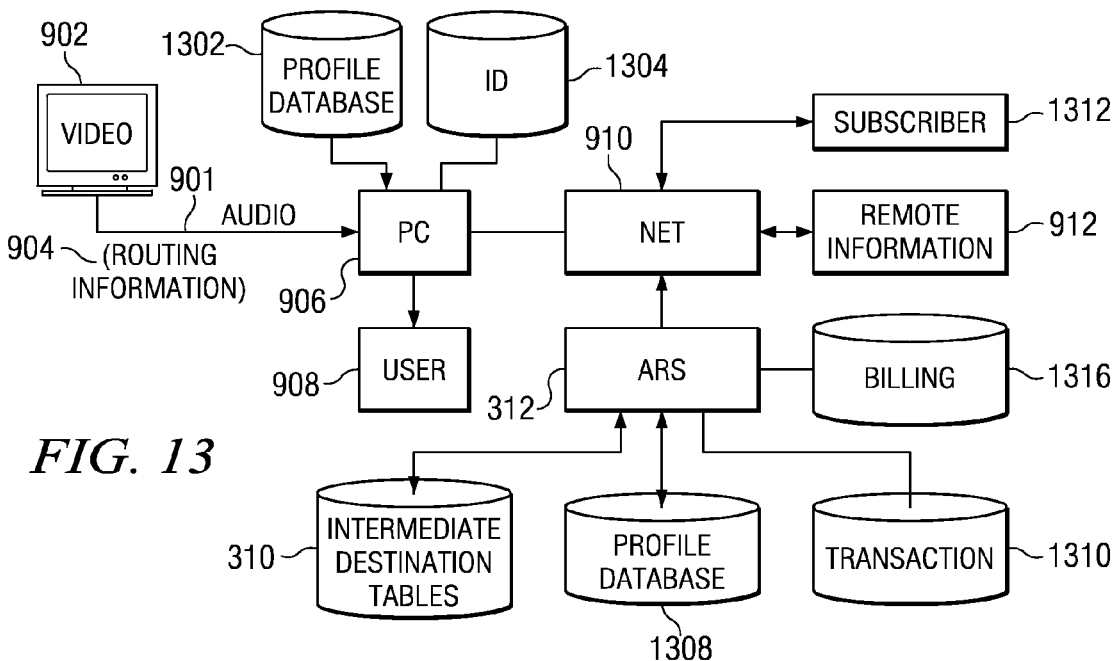
FIG. 13

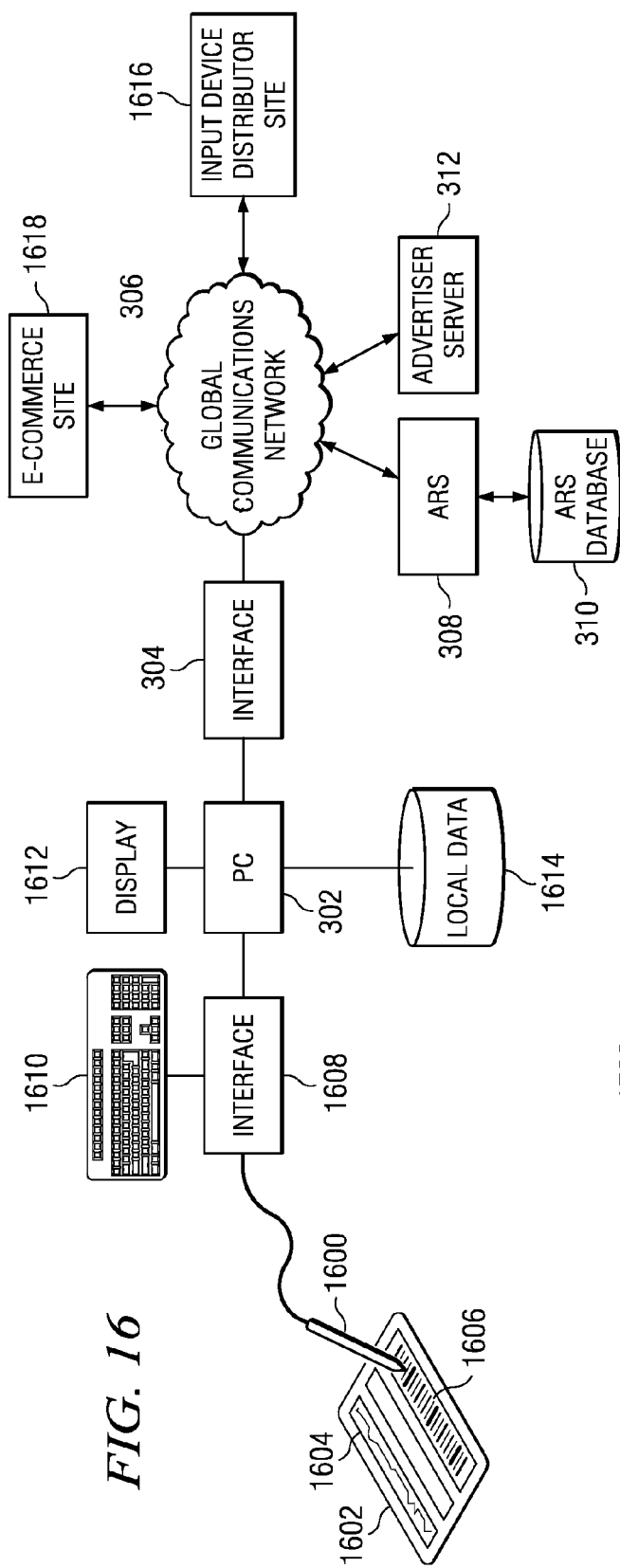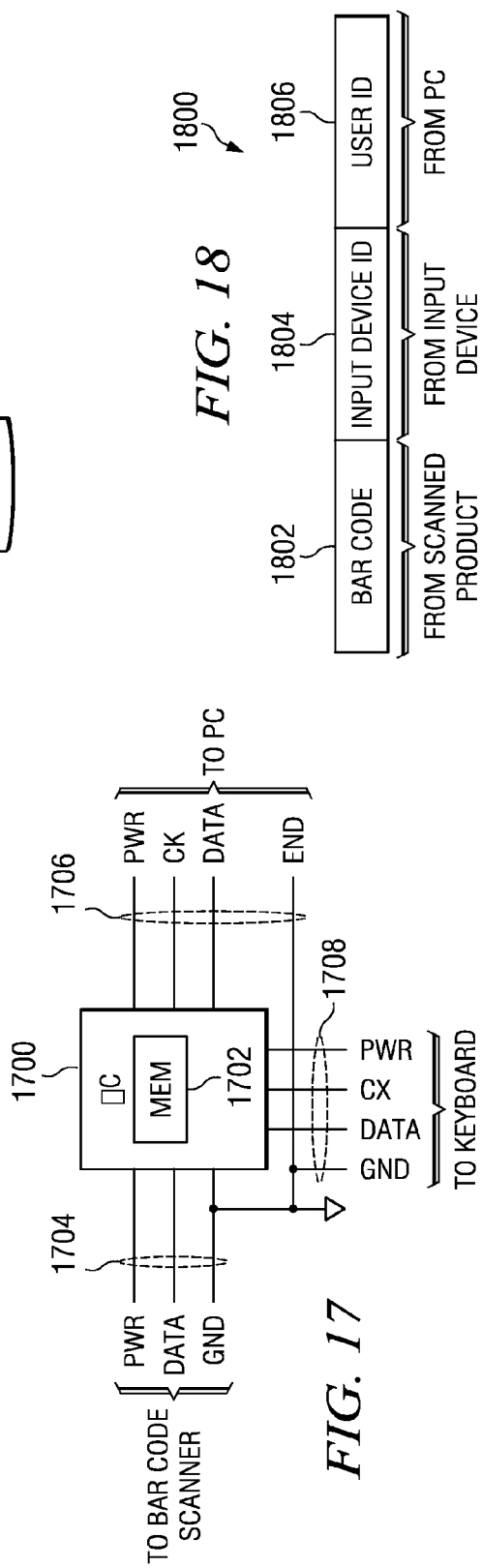

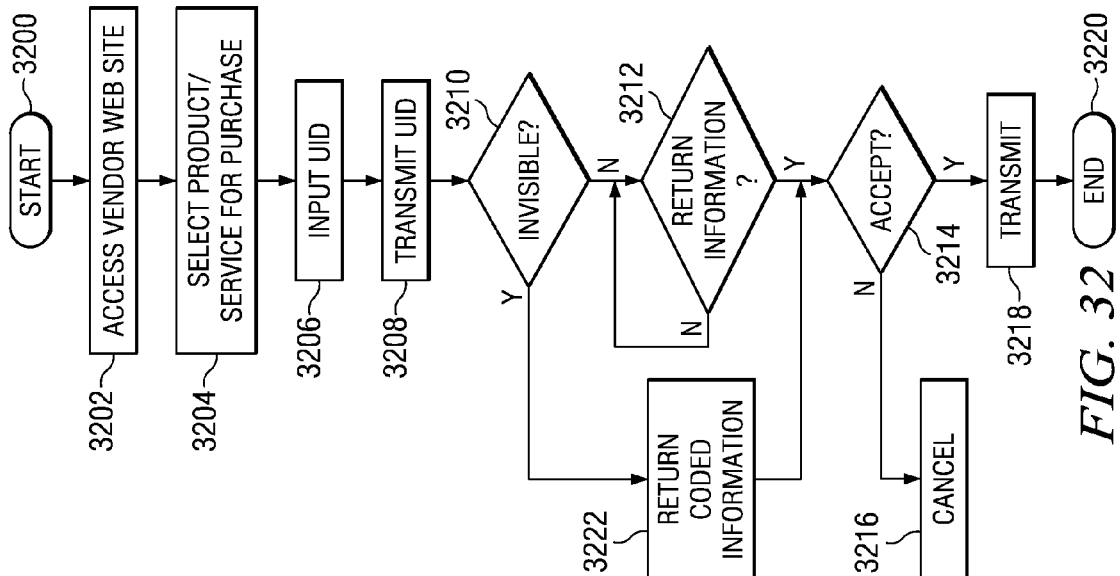
FIG. 32
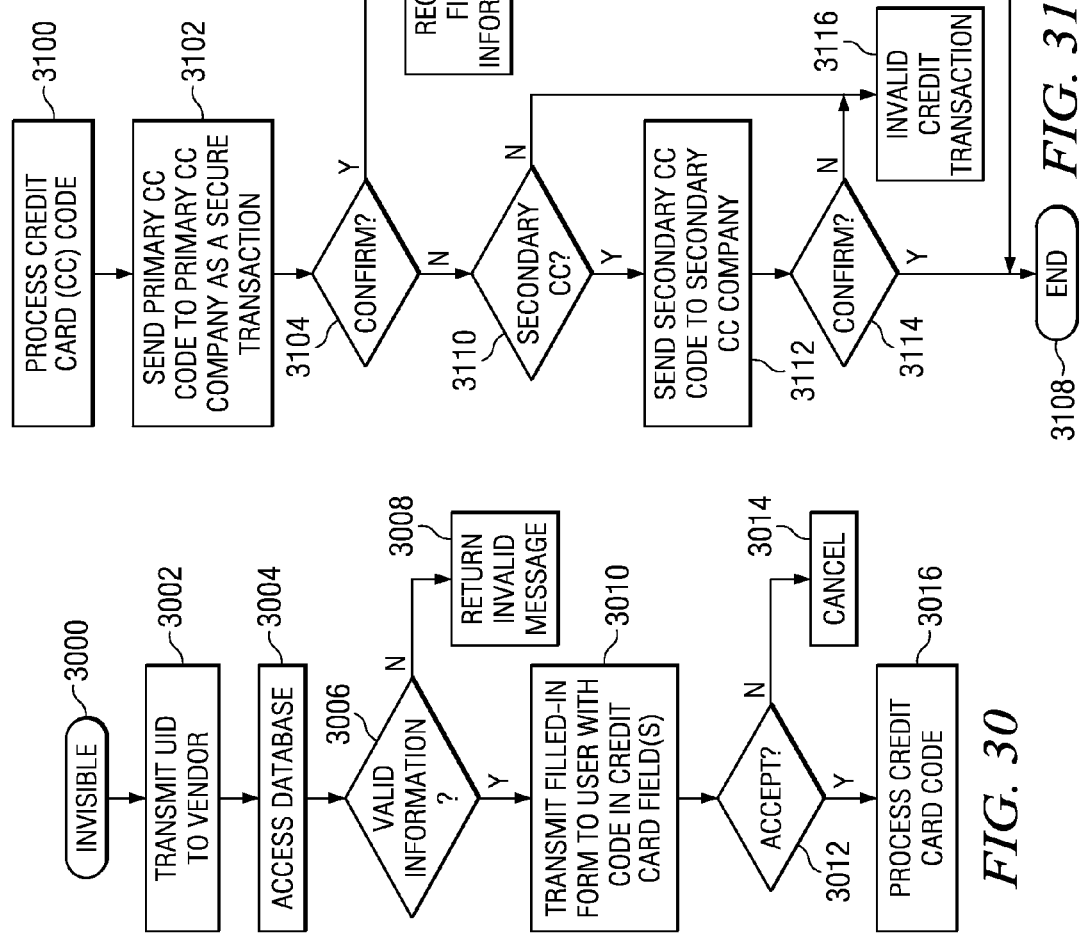
FIG. 31
FIG. 30

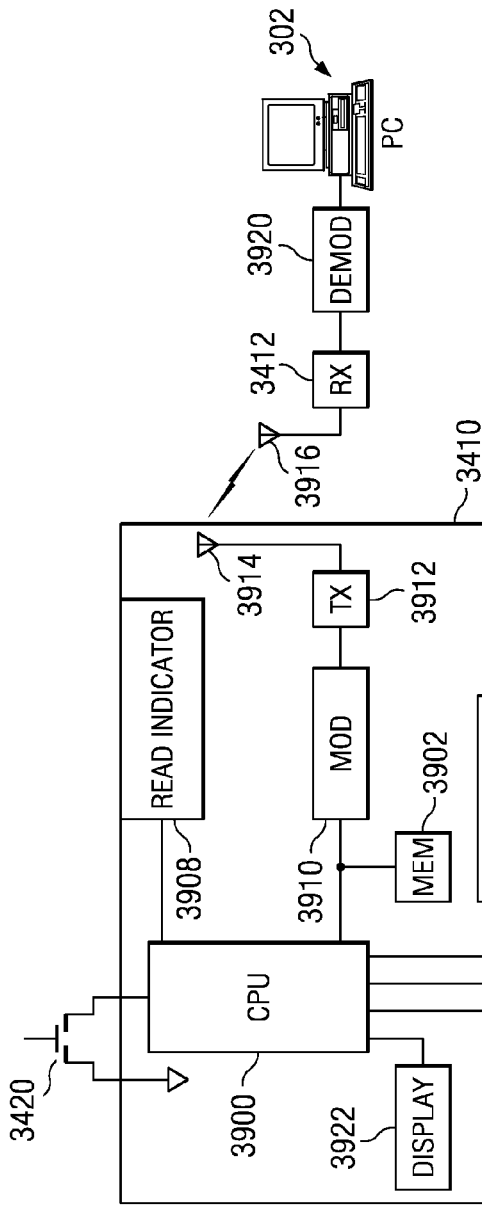

ACCESSING A VENDOR WEB SITE USING PERSONAL ACCOUNT INFORMATION RETRIEVED FROM A CREDIT CARD COMPANY WEB SITE

CROSS-REFERENCE TO RELATED APPLICATIONS

This application is a Continuation-in-Part of pending U.S. patent application Ser. No. 09/382,422 entitled "UNIQUE ID FOR IDENTIFYING A USER AND FACILITATING AN E-COMMERCE TRANSACTION" filed Aug. 24, 1999, which is a Continuation-in-Part of pending U.S. patent application Ser. No. 09/378,221 entitled "METHOD AND APPARATUS FOR ACCESSING A REMOTE LOCATION BY SCANNING AN OPTICAL CODE" filed on Aug. 19, 1999, which is a Continuation-in-Part of the following U.S. patent application Ser. No. 09/151,471 entitled "METHOD FOR INTERFACING SCANNED PRODUCT INFORMATION WITH A SOURCE FOR THE PRODUCT OVER A GLOBAL NETWORK," filed on Sep. 11, 1998 and issued U.S. Pat. No. 6,098,106 entitled "METHOD FOR CONTROLLING A COMPUTER WITH AN AUDIO SIGNAL," which issued on Aug. 1, 2000. This application is related to co-pending application entitled PERFORMING AN E-COMMERCE TRANSACTION FROM CREDIT CARD ACCOUNT INFORMATION RETRIEVED FROM A CREDIT CARD COMPANY WEB SITE Ser. No. 09/659,167 filed of even date.

TECHNICAL FIELD OF THE INVENTION

This invention is related to a method for providing access to a vendor web site via credit card account information retrieved from a credit card company server disposed on a network. More particularly, a user reads a machine-resolvable code on a credit card with an input device, which operation automatically retrieves the account information along with one or more hyperlinks for connecting the user to vendor web sites on the network.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . ." down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

Many types of optical readers are known, however, their cost and complexity have heretofore limited their use primarily to industrial and commercial users. Now, many new network-based technologies are being developed for home users which involve optical scanning. Thus, the need for a simple, low cost optical reader which can be attached to a personal computer has emerged.

SUMMARY OF THE INVENTION

The present invention disclosed and claimed herein, in one aspect thereof, comprises a method of accessing a vendor web site over a global communication packet-switched network using personal account information of a credit card retrieved from a credit card company server on the network. At a user location disposed on the network, a machine-resolvable code (MRC) of the credit card of a user is read with a reading device. Coded information is extracted from the MRC. Routing information associated with the coded information is obtained, which routing information corresponds to the personal account information of the user stored on a credit card company server disposed on the network. The user location connects to the credit card company server across the network in accordance with the routing information. The personal account information is returned from the credit card company server to the user location. The personal account information is then presented to the user at the user location. A hyperlink to a vendor web site is provided in the personal account information. Web site information of the vendor web site is displayed in response to the user selecting the hyperlink.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 16 illustrates a general block diagram of a disclosed embodiment;

FIG. 17 illustrates the conversion circuit of the wedge interface;

FIG. 18 illustrates a sample message packet transmitted from the user PC to the ARS;

FIG. 30 illustrates a flowchart of the process for an invisible from transaction;

FIG. 31 illustrates a flowchart for processing the credit card code according to the invisible transaction;

FIG. 32 illustrates a flowchart of the selection process for a standard and invisible payment method;

FIG. 38 illustrates a database structure of a disclosed embodiment;

FIG. 39 illustrates a general block diagram of the portable input device in operation with the PC;

FIG. 41 illustrates a basic data signal sent from the scanner to the PC;

DETAILED DESCRIPTION OF THE INVENTION

Figure 1:
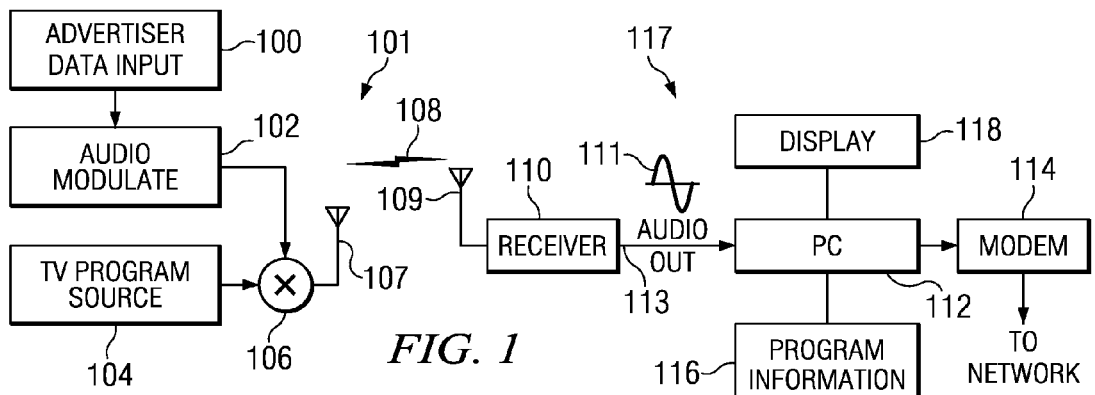
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
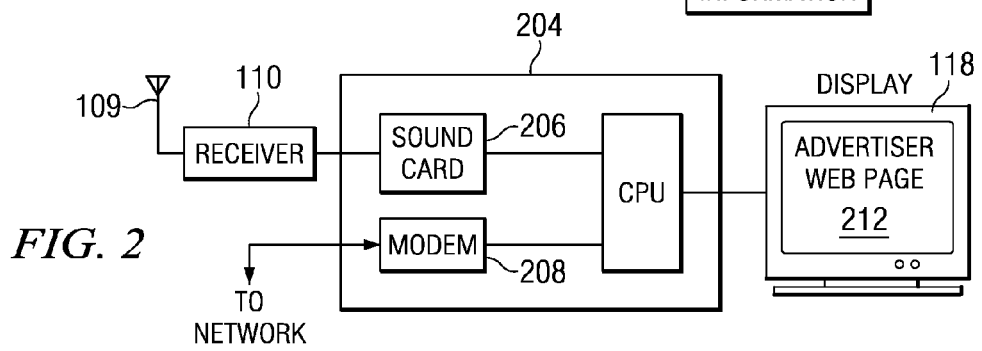
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL.

This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
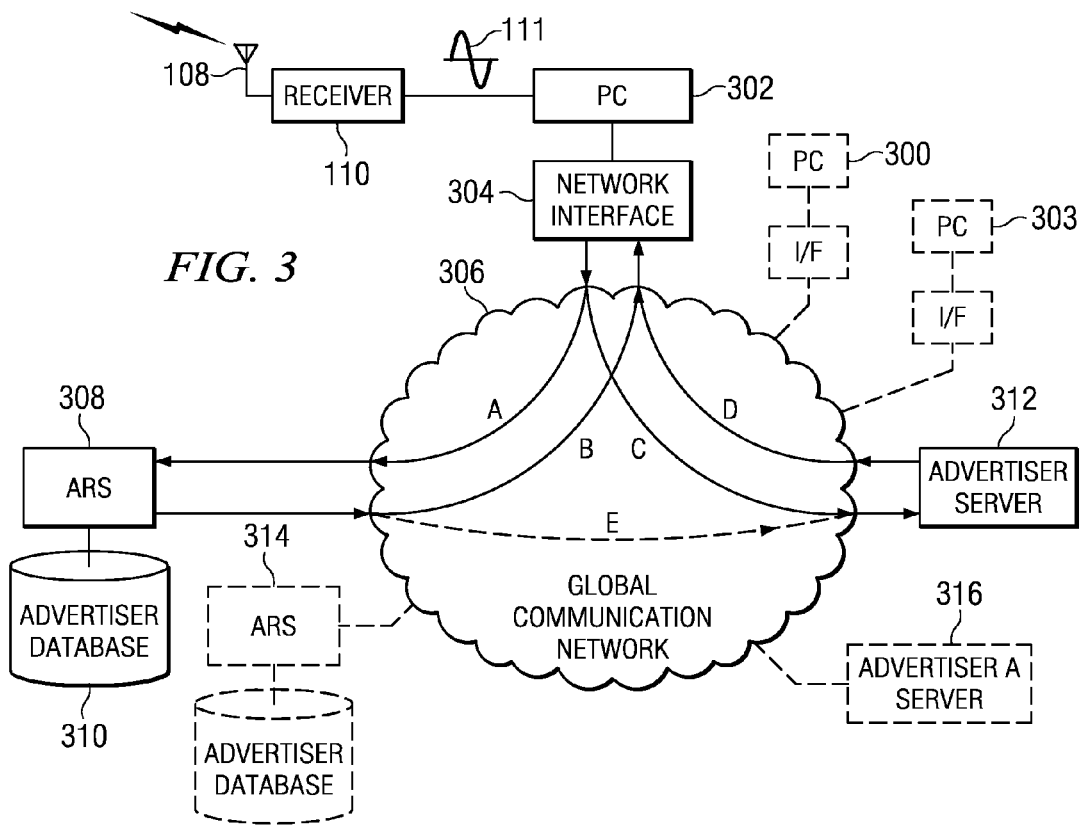
FIG. 3 illustrates system interactions over a global network.

Referring now to FIG. 3, there is illustrated a source PC 302, similar to PCs 204 and 112, connected to a global communication network (GCN) 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the network 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe to this technology, manufacturer and product information are added to the database 310 without interrupting operation of the source PC 302 with frequent updates. When the advertiser server address URL is obtained from the ARS database 310, it and the request for the particular advertiser product information is automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4*a*-4*e* illustrate the various message packets transmitted between the source PC and network servers used in the preferred embodiment.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:
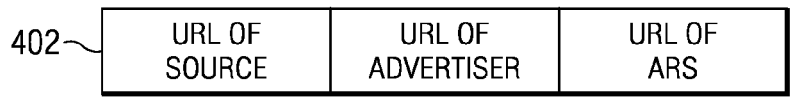

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape(V and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figure 5:
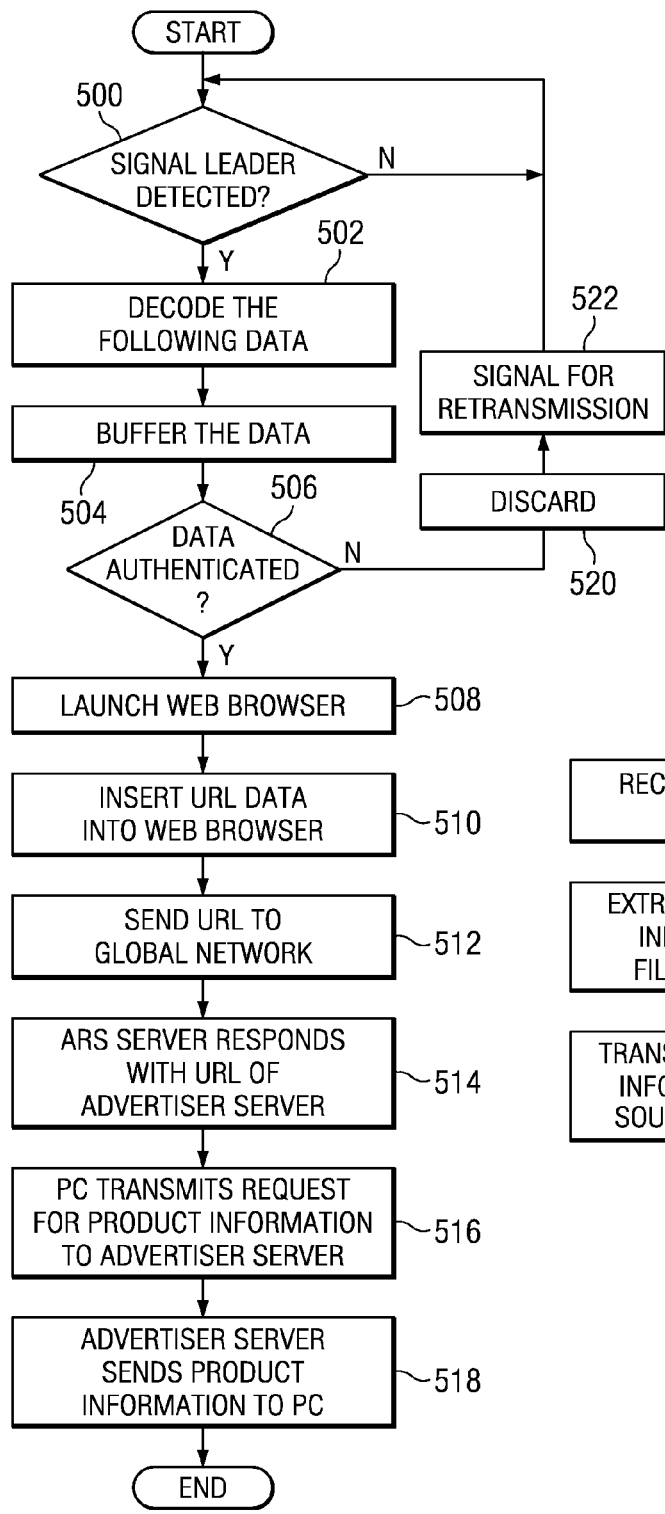
FIG. 5 is a flowchart depicting operation of the system according to the preferred embodiment.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing. The user may obtain the benefits of this architecture by simply downloading the proprietary software over the network. Other methods for obtaining the software are well-known; for example, by CD, diskette, or pre-loaded hard drives.

Figure 6:
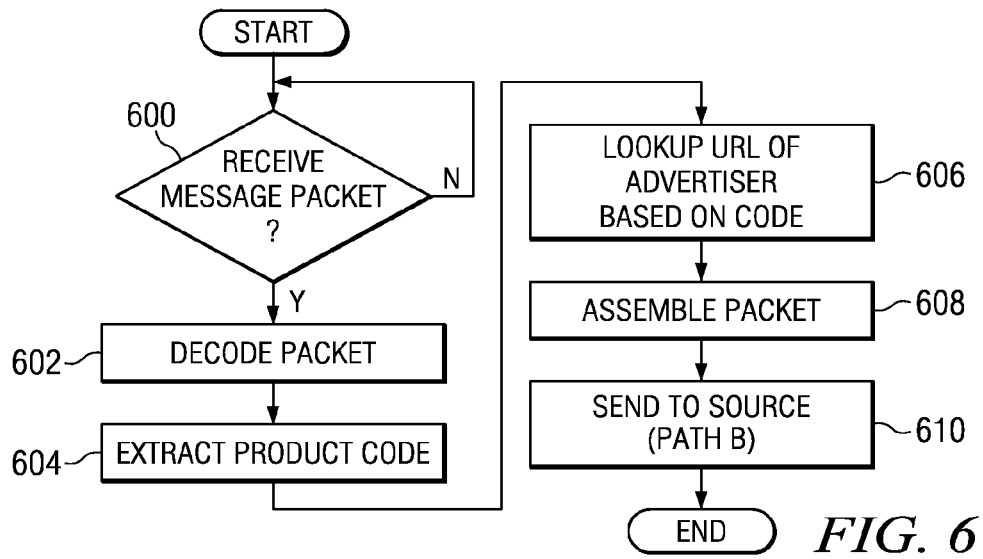
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Figure 7:
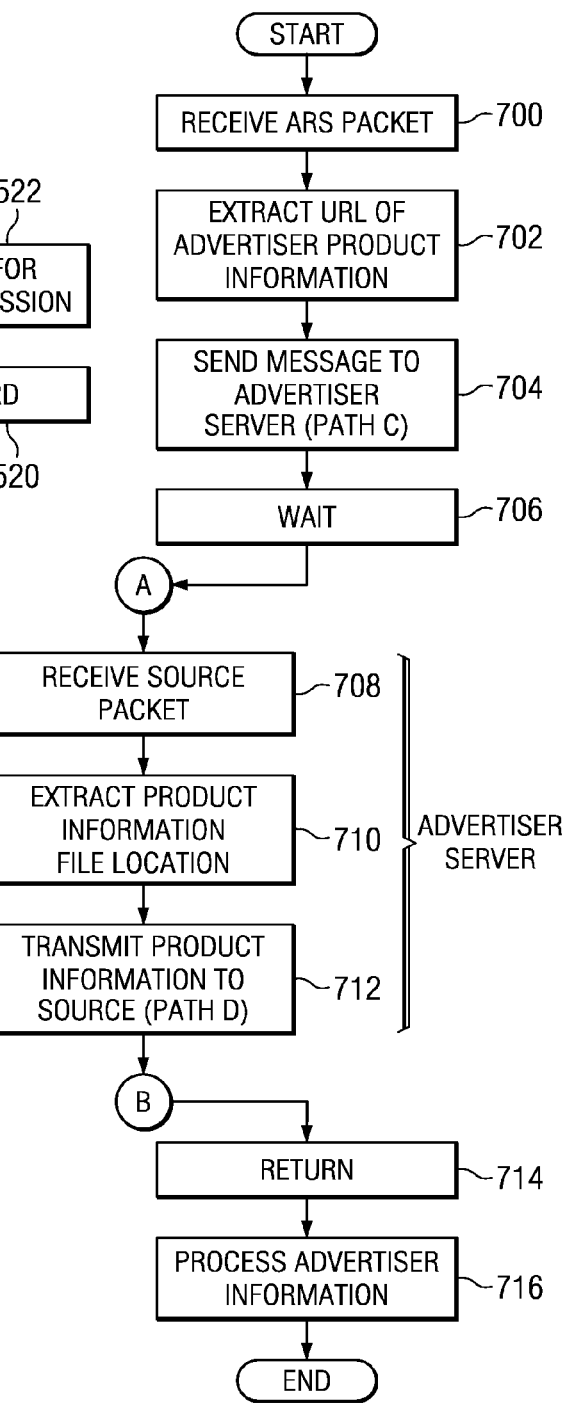
FIG. 7 illustrates a flowchart of the interactive process between the source computer and ARS.

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
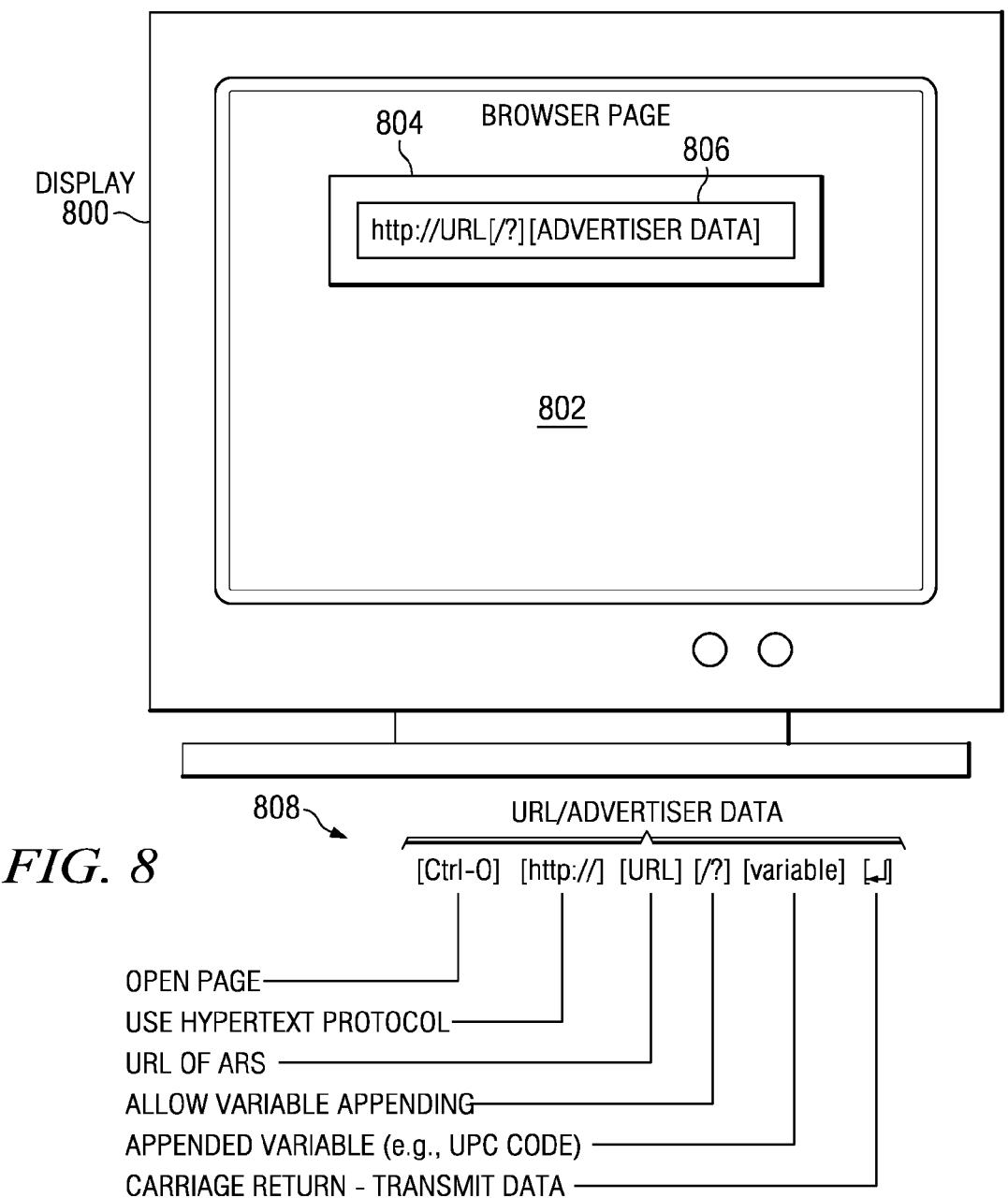
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the I? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS308, to the source PC 302, to the advertiser server 312, and back to the source PC 302, occur quickly and are transparent to the viewer. At this point, the next information the viewer sees is the product information which was received from the advertiser server 312.

Figure 9:
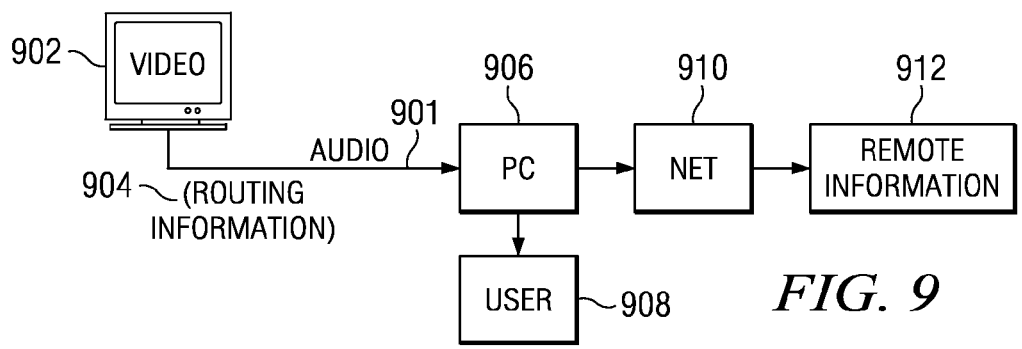
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
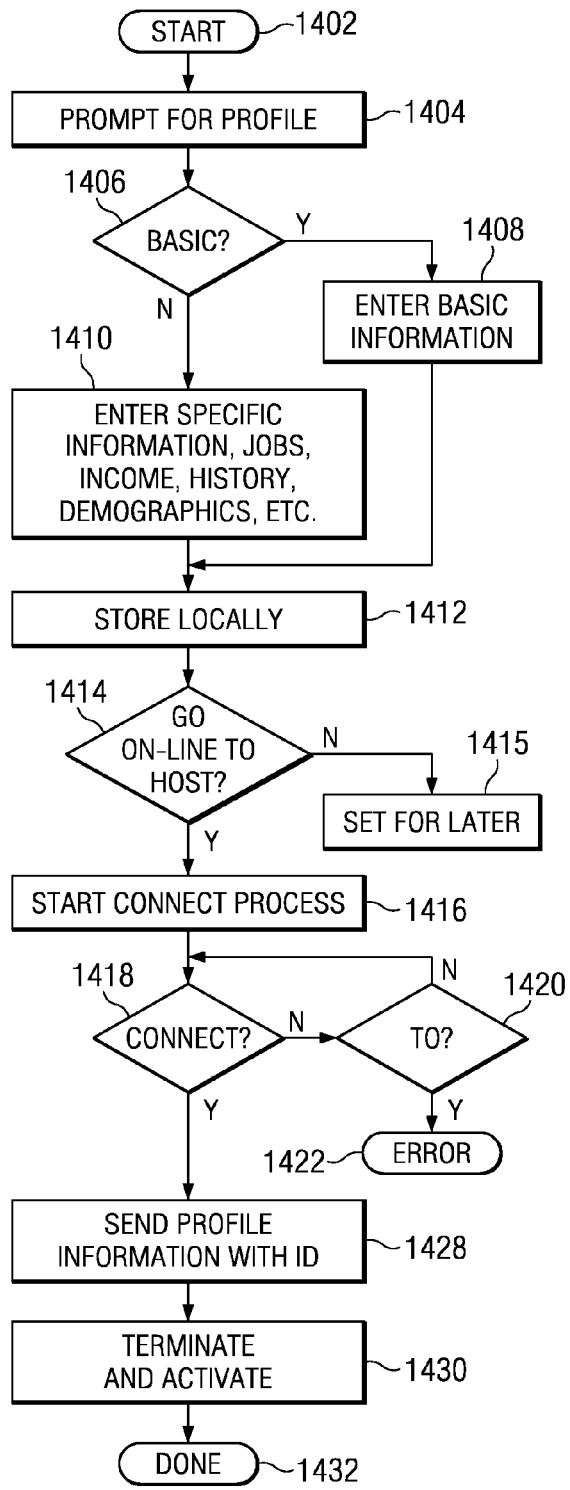
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
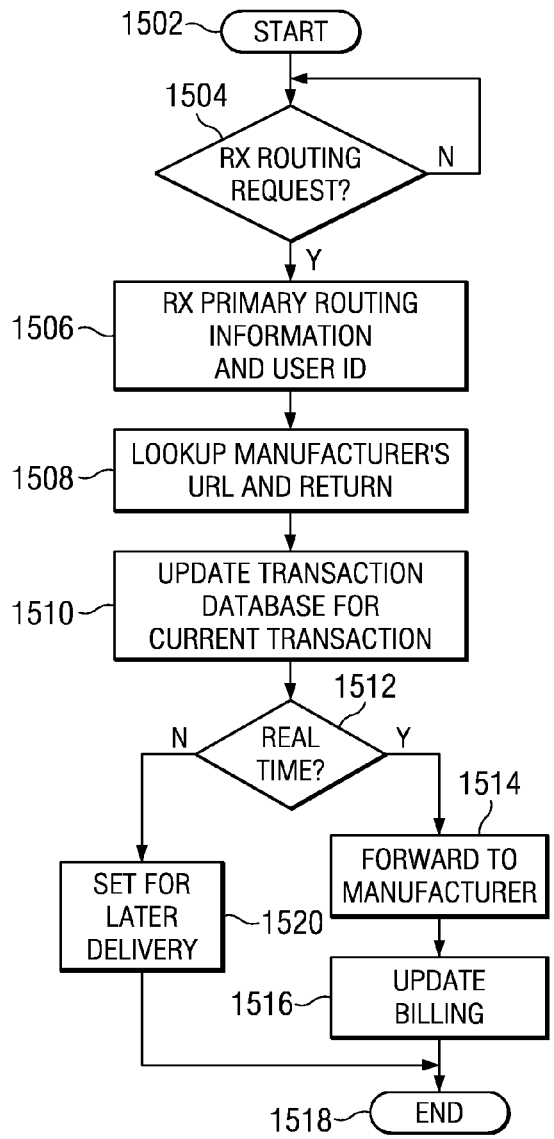
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing, information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to lookup the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user PC 302 which will cause the user PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user PC 302 and a profile of the user themselves. Therefore, an advertiser can actually gain realtime information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Referring now to FIG. 16, there is illustrated a general block diagram of a disclosed embodiment. A bar code scanning input device 1600 is provided by a input device distributor to customers and is associated with that distributor via a input device ID stored therein. The input device 1600 is either sold or freely distributed to customers for use with their personal computing systems. Since more and more products are being sold using bar codes, it can be appreciated that a user having the input device 1600 can scan bar codes of a multitude of products in order to obtain more information. Information about these products can be made immediately available to the user from the manufacturer for presentation by the user's computer 302. Beyond simply displaying information about the product in which the user is interested, the input device distributor may include additional advertising information for display to the user such as information about other promotions or products provided or sold by the input device distributor. Similarly, advertisers may provide catalogs of advertisements or information in newspapers or periodicals where the user simply scans the bar code associated with the advertisement using the input device 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the input device 1600 can be any type of device that will scan any type of image having information encoded therein.) After obtaining the input device 1600 from the input device distributor, the user connects the input device 1600 to their PC 302. During a scanning operation, input device 1600 reads bar code data 1606 and the input device ID into a "wedge" interface 1608 for conversion into keyboard data, which keyboard data is passed therefrom into the keyboard input port of PC 302. The importance of the input device ID will be discussed in more detail hereinbelow.

The wedge interface 1608 is simply an interface box containing circuitry that accommodates inputs from both the scanning input device 1600 and a computer keyboard 1610. This merely allows the information scanned by the input device 1600 to be input into the PC 302. In the disclosed embodiment, the wedge interface 1608 will convert any information. The data output from the input device 1600 is passed into the wedge interface 1608 for conversion into keyboard data which is readily recognizable by the PC 302. Therefore, the input device 1600 is not required to be connected to a separate port on the PC 302. This data is recognized as a sequence of keystrokes. However, the output of the input device 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the input device 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the input device ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the input device 1600, the PC 302 hosts input device software which is operable to interpret data transmitted from the input device 1600, and to create a message packet having the scanned product information and input device ID, routing information, and a user ID which identifies the user location of the input device 1600. The input device software loads at boot-up of the PC 302 and runs in the background. In response to receiving a scanned bar code 1606, the wedge interface 1608 outputs a keystroke code (e.g., ALT-F10) to bring the input device program into the foreground for interaction by the operating system. The input device program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The input device program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the input device 1600, information about the input device distributor which establishes the identity of the company associated with that particular input device 1600, and at least one or more other frames which may be advertisements related to other products that the input device distributor sells. Note that the advertisements displayed by the input device distributor may be related to the product of interest or totally unrelated. For example, if a user scans the bar code 1606 of a soda from Company A, the input device distributor may generate an advertisement of a new soft drink being marketed by Company A, that it sells. On the other hand, the input device distributor may also structure the display of information to the user such that a user requesting product information of a Product X may get the requested information of Product X along with advertisements for a competing item Product Y. Essentially, the input device distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the input device distributor site 1616 and E-commerce site 1618 to obtain the information that needs to be framed in the browser window displayed to the user.

Therefore, the input device 1600 is associated with the input device distributor by way of a input device ID such that scanning a product bar code 1606 in order to obtain information about that particular product generates one or more responses from one or more remote sites disposed on the GCN 306. Stored in the input device 1600 is the input device ID which establishes its relationship to the input device distributor. Proprietary input device software running on the PC 302 operates to decode scanned bar code information and the input device ID received from the input device 1600 and wedge interface 1608, and also provides a unique user ID for establishing the location of the user of the input device 1600. The input device software also assembles message packets and works in conjunction with the on-board communication software (e.g., a browser) to automatically route the message packets across the GCN 306 such that the one or more remote sites disposed on the GCN 306 return information to be framed for presentation to the user.

Referring now to FIG. 17, there is illustrated a conversion circuit of the wedge interface. A microcontroller 1700 provides conversion of the data from the input device 1600 and controls interfacing of the keyboard 1610 and input device 1600 with the PC 302. The microcontroller 1700 has contained therein a memory 1702 or it can have external memory. There are provided a plurality of input device interfaces 1704 to the input device 1600, a plurality of PC interfaces 1706 to the PC 302, and plurality of keyboard interfaces 1708 to the keyboard 1610. In general, the input device interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the input device 1600, the serial data is not compatible with a keyboard 1610 and, therefore, it must be converted into a keyboard format in order to allow input thereof to the keyboard input of the PC 302.

The microcontroller 1700 performs this function after decoding this bar code information, and conversion of this bar code information into an appropriate stream of data which is comprised of the bar code information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the input device 1600 and the keyboard 1610 to the PC 302 which allows the input device 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the input device 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4 k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with input device 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the input device 1600; the input device ID 1804 which is embedded in a memory in the input device 1600 and identifies it with a particular input device distributor; and a user ID 1806 which is derived from the software running on the PC 302 and which identifies uniquely with the user location. Note that the message packet includes other necessary information for the proper transmission for point to point.

Figure 19:
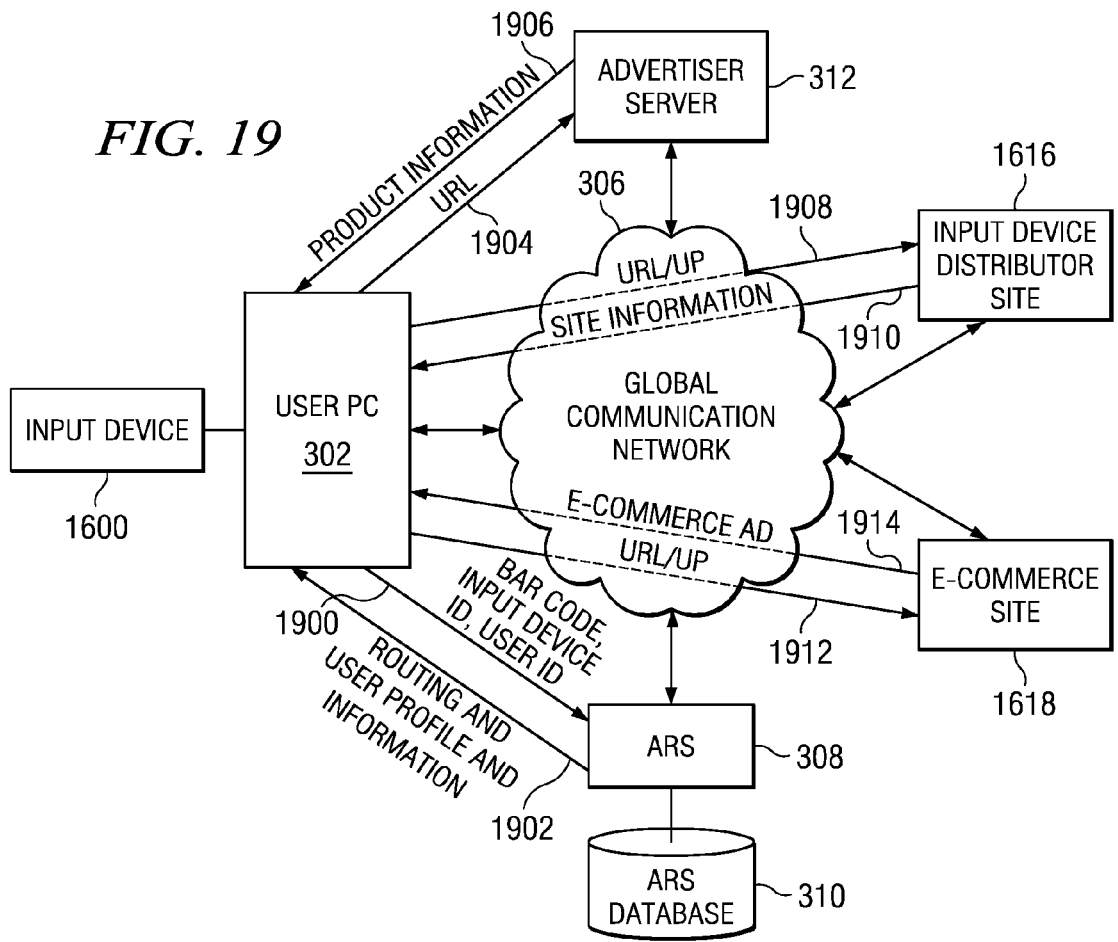
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the input device 1600, a input device program running on the user PC 302 is operable to interpret the information output by the input device 1600 and generate a message packet for transmission over the GCN 306. The input device program assembles the message packet such that it is directed to the ARS 308 disposed on the GCN 306. The message packet contains several pieces of information including the input device ID 1804 which links it to the input device distributor, the user ID 1806 which identifies the particular user using the input device 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and input device distributor. The ARS 308 returns a message packet over a path 1902 to the user PC 302 which contains routing information as to the location of various other sites disposed on the GCN 306, for example, the advertiser server 312 and input device distributor site 1616.

It can be appreciated that other information can also be provided by the ARS 308 which more closely targets the particular user of the input device 1600. For example, if it is known that a particular input device 1600 is sold in a certain geographic area, this information can be useful in targeting the particular user with certain advertising information relevant to that geographic area. In any case, the information returned from the ARS 308 over path 1902 provides enough information for the input device program running on-the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the input device distributor site and the user profile) to the input device distributor site 1616 over a path 1908 in order to obtain information back over a path 1910 for framing any banners which identify the input device distributor. Additionally, the user PC 302 forwards a message packet to the E-commerce site 1618 over a path 1912 in order to return information regarding any particular advertisements the input device distributor wants to display to the user. The advertisements are returned to the PC 302 over a path 1914.

Figure 20:
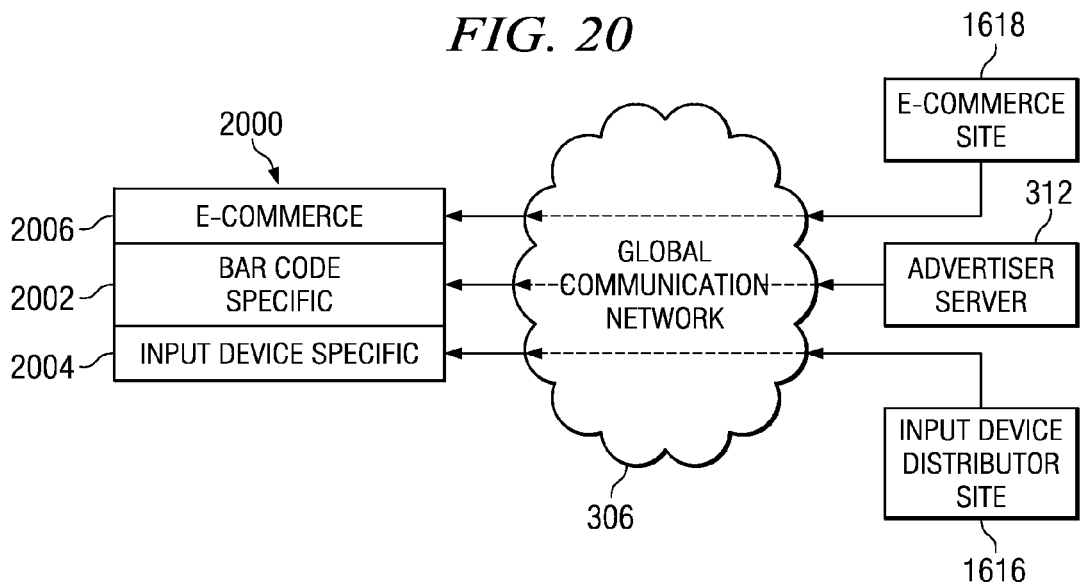
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; an input device-specific area 2004 displays information about the input device distributor; and an E-commerce area 2006 displays advertising information that the input device distributor selects for display according to this particular user and input device 1600. As mentioned hereinabove, a program operable to process scanned bar code information with the unique input device 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the input device specific area 2004 is information about the input device distributor which is returned from the input device distributor site 1616 across GCN 306.

Figure 21:
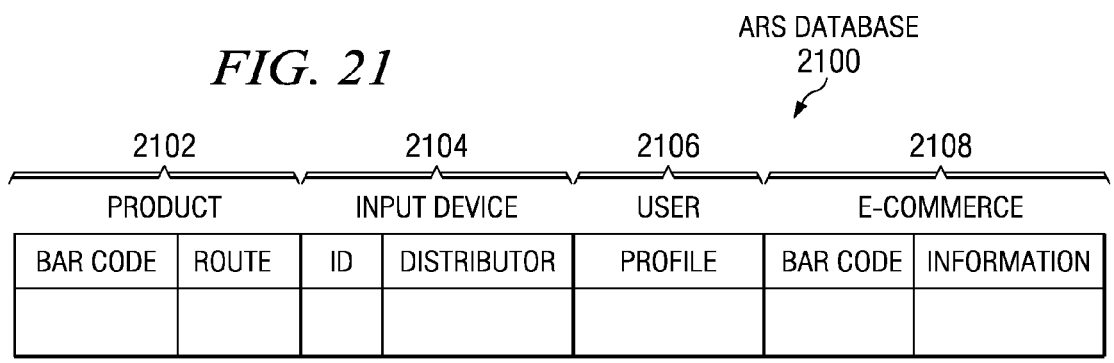
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the input device 1600. Under a PRODUCT heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of INPUT DEVICE under which is the input device ID 1804 and the distributor associated with that input device ID 1804.

It can be appreciated that there may be a number of distributors using the disclosed architecture such that each distributor has an ID embedded in the input device 1600 which uniquely identifies that input device with the particular distributor. Therefore, the unique input device ID 1804 needs to be listed with the respective distributors of that input device 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the input device software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
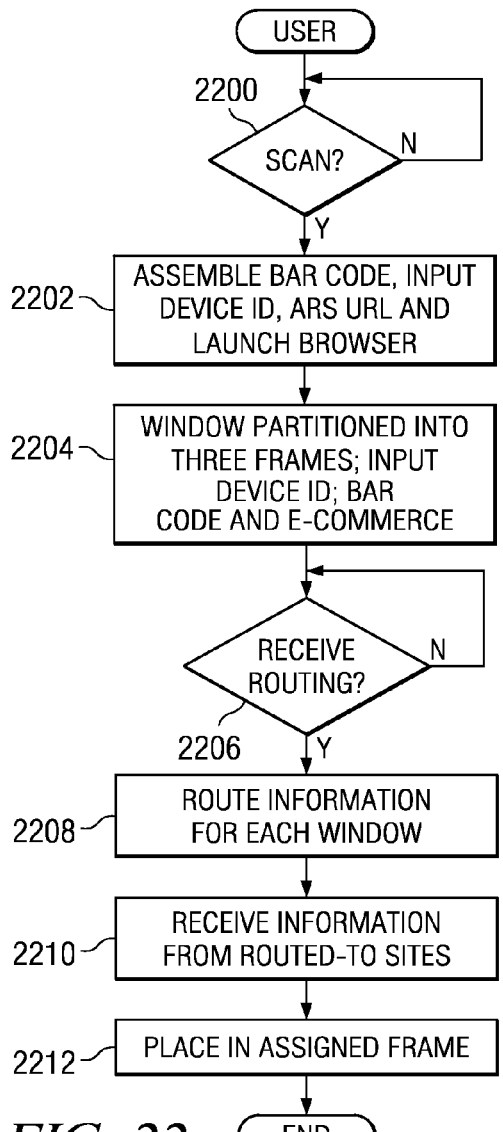
FIG. 22 illustrates a flowchart of the process of receiving information for the user's perspective.

Referring now to FIG. 22, there is illustrated a flowchart of the process of receiving information from the user's perspective, and according to the disclosed embodiment. The input device software running on the user's PC 302 runs in the background until activated by output from the input device 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the input device software assembles a message packet containing the bar code information, the input device ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the input device distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the input device software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to input device distributor information, and possibly other advertisements based upon the user's profile.

Figure 23:
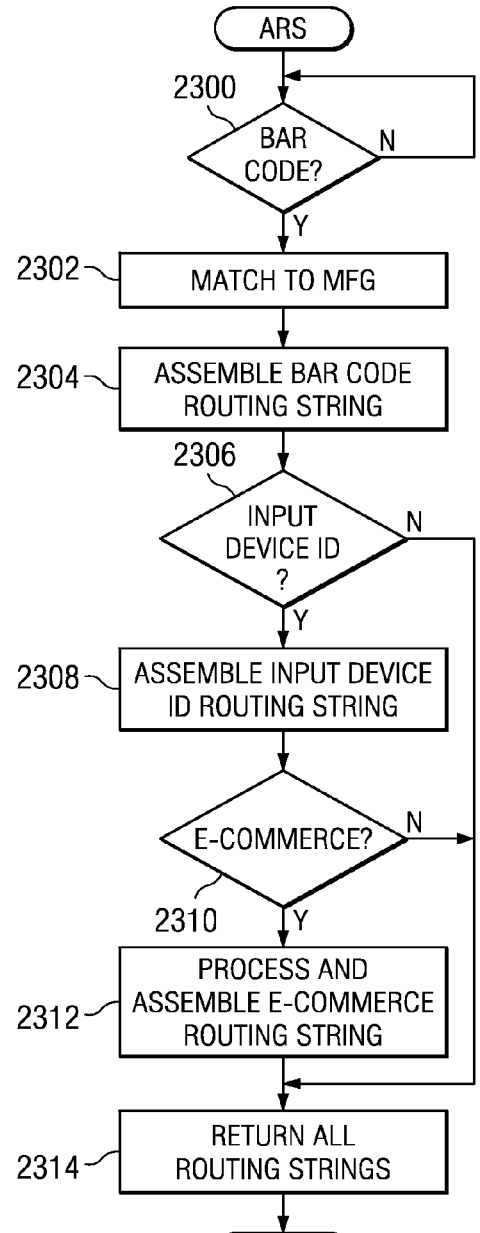
FIG. 23 illustrates a flowchart according to the ARS.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the input device ID 1804 is compared with the list of input device IDs issued by the particular input device distributor. If the input device ID 1804 is validated, flow moves out the "Y" path to a function block 2308 where the message packet is appended with the input device ID 1804 and distributor routing address. Flow then moves to a decision block 2310 where the ARS 308 determines if any E-commerce information is to be associated with a particular input device ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the input device ID 1804 is determined to be invalid, flow moves out the "N" path and jumps forward to the input of decision block 2314, since the lack of a input device ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and input device ID 1804 information.

Figure 24:
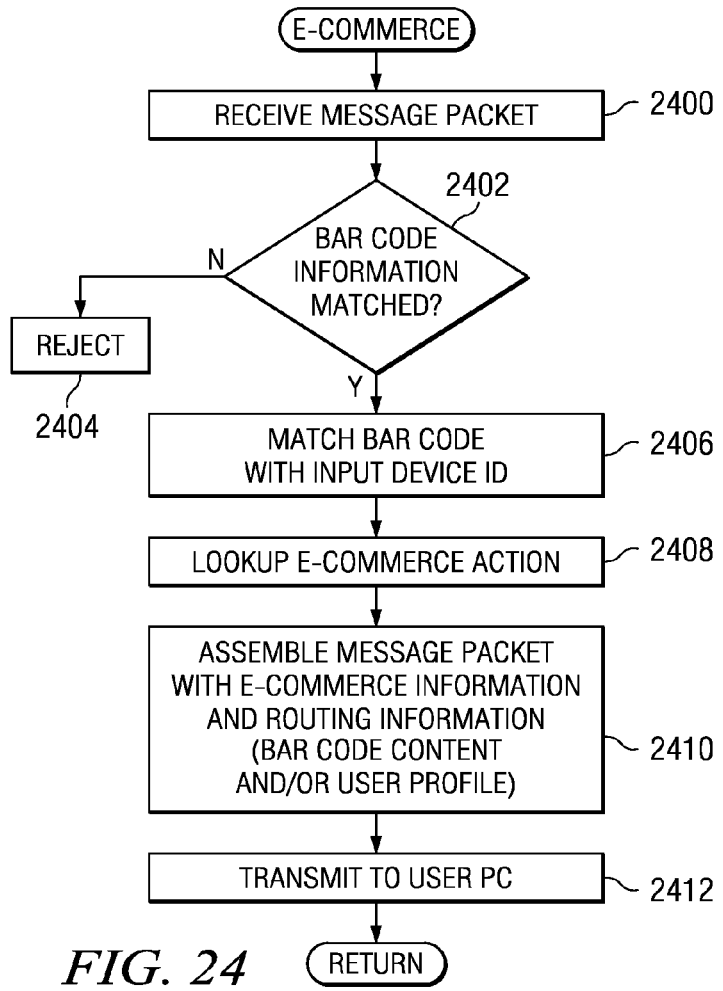
FIG. 24 illustrates a flowchart of the process performed at the E-commerce node.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the input device ID 1804 is matched with the bar code product information. The bar coded information may be distributed to customers over a large geographic area. However, the input device 1606 may be coded for certain geographic areas. For example, a input device 1600 having an XXX ID may be restricted for sale in the Southwestern United States while a input device 1600 having a YYY ID may be sold only in the Northeast. In this way, geographic areas may be targeted with advertising more appealing to that particular area. Advertising returned to the user PC 302 may be focused further by obtaining a user profile when the software or input device 1600 are installed. In this way, advertising may be focused based upon the user profile. Therefore, flow moves to a function block 2408 to lookup the E-commerce action based upon the input device ID 1804 and the bar code information. Flow moves to a function block 2410 to assemble all the information into a packet for return to the user PC 302. The product information and/or user profile information may be returned. Flow is then to a function block 2412 where the message packet is transmitted.

Figure 25:
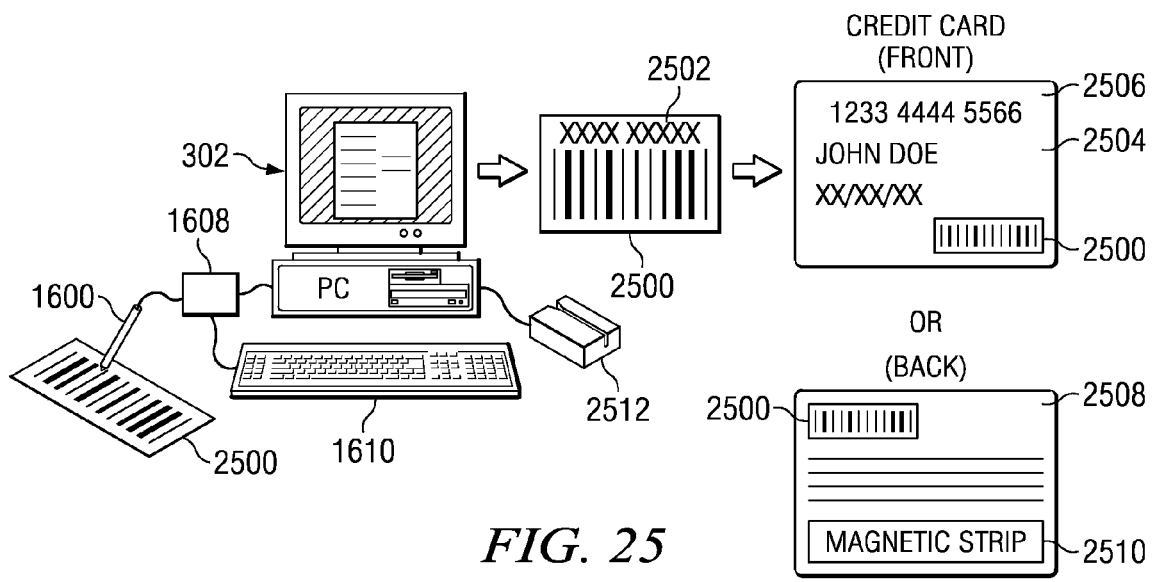
FIG. 25 illustrates a general concept according to a disclosed embodiment.

Referring now to FIG. 25, there is illustrated a general concept according to the disclosed embodiment. Eventually, when a user makes on-line purchases, the user is required to fill out sometimes lengthy forms in order to provide the payment information required to complete the transaction. The disclosed architecture provides a solution where the user need only fill in a form of personal and credit information (hereinafter called "profile information") one time. Subsequently a digital user ID and associated bar code are provided which references all of this personal and credit information. Therefore, for any subsequent on-line purchases, the user simply needs to provide the bar code and/or unique user ID to provide any personal or credit information for completing the transaction. The need for the user to repeatedly fill out lengthy forms for each on-line transaction is now obviated. The architecture can now be marketed where a user purchases or is freely given the wedge interface device 1608 and the software needed to provide the digital user ID/bar code. Note that the bar code may be of a type universal product code (UPC), a European product code standard EAN, and an ISBN numbering convention.

Upon installation of the wedge interface 1608, the user is required to install the software and fill out the personal and credit information form provided in the software. The form may request such information as the user's name, address, phone number, the ship-to information, credit card information, such as the account number, the issuing credit card company name and address, and any other credit information required. This software may also require that the user provide more than one credit card, that is, a primary credit card, and a secondary credit card. Therefore if the first credit card for some reason does not allow charging of the on-line purchase, the secondary credit card can be used to complete the transaction. Therefore, the user at PC 302 uses a keyboard 1610 which is connected to the wedge interface 1608 to key information into the form provided by the software. Upon providing all the information required in the form, a bar code 2500 is issued which is unique to the individual and is associated with the profile information provided by the user. The bar code 2500 also has associated with it a unique ID number 2502 which the user may provide to an on-line vendor to complete the purchase transaction. Therefore upon issuance of the bar code 2500, the user at PC 302 may use a scanning wand 1600 to scan the bar code for subsequent input to vendors to complete the purchase process for an on-line purchase. As mentioned hereinabove, in lieu of scanning the bar code for input in the PC 302, the user may simply use the keyboard 1610 to input the unique ID number 2502 to complete the purchase process.

The bar code 2500/unique ID number 2502 may also be placed on a user's credit card 2504 for ease of use. The bar code 2500 may be placed on the front face 2506 of the credit card or optionally may be placed on the back side 2508 of the credit card 2504 in a convenient location. It is conceivable that the bar code 2500 may also be placed directly on top of a magnetic strip portion 2510 located on the back 2508 of the credit card 2504. In any case, the bar code 2500 needs to be situated appropriately such that it can be swiped with a credit card swipe unit 2512 for later use. The credit card swiping 2512 may be constructed such that if the bar code 2500 were placed directly on the magnetic strip 2510 that magnetic coupling means in the unit may be used to read the information on the magnetic strip 2510 while an optical reading means in the same read portion of credit card swipe unit 2512 may read the bar code 2500 information.

Since credit cards can be lost or stolen, an enhanced measure of security may provide that the user be issued a personal identification number (PIN) which must be supplied along with the unique ID/bar code, when used. Note that when the architecture is used in conjunction with a credit card company, the logistics of placing a bar code on the credit card is convenient in that the information can be provided at the time the customer first applies for a credit card. Therefore when the credit card is issued, it already arrives at the customer location with the bar coded information on the credit card.

Figure 26:
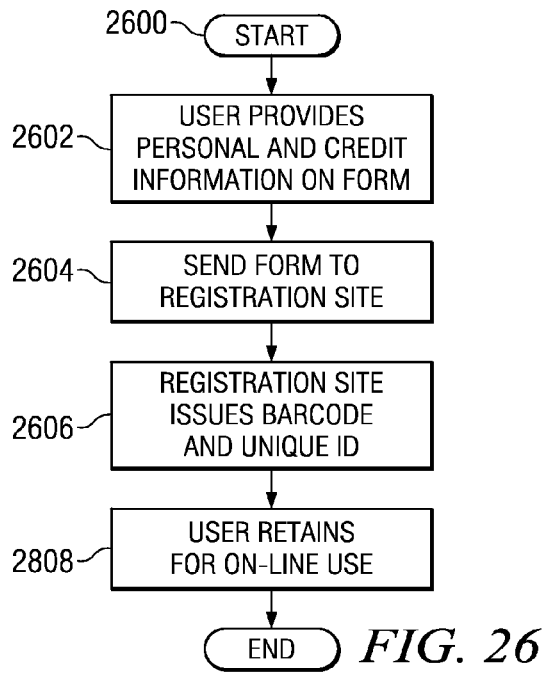
FIG. 26 illustrates a flowchart of the process for providing the personal and credit information.

Referring now to FIG. 26, there is illustrated a flowchart of the process for providing the personal and credit information. Flow begins at a starting point 2600 and moves to a function block 2602 where the user inputs personal and credit information into a form. To provide a secure environment in which this personal and credit information is provided, the form may be either mailed as a hard-copy form to the user to fill out or the user may be asked to call a telephone number and provide the information over the phone to an assistant at the other end. Flow is then to a function block 2604 where the user sends the form to the registration site (e.g., the credit card company). Flow is then to a function block 2606 where the registration site issues a bar code and unique ID back to the user (in the case of a credit card company, the credit card is issued to the user with the bar code 2500 and unique ID 2502 imprinted thereon). The user then retains the bar code 2500 and unique ID 2502 for any on-line use, as indicated in function block 2608. Flow is then to an end point where the process is completed.

Figure 27:
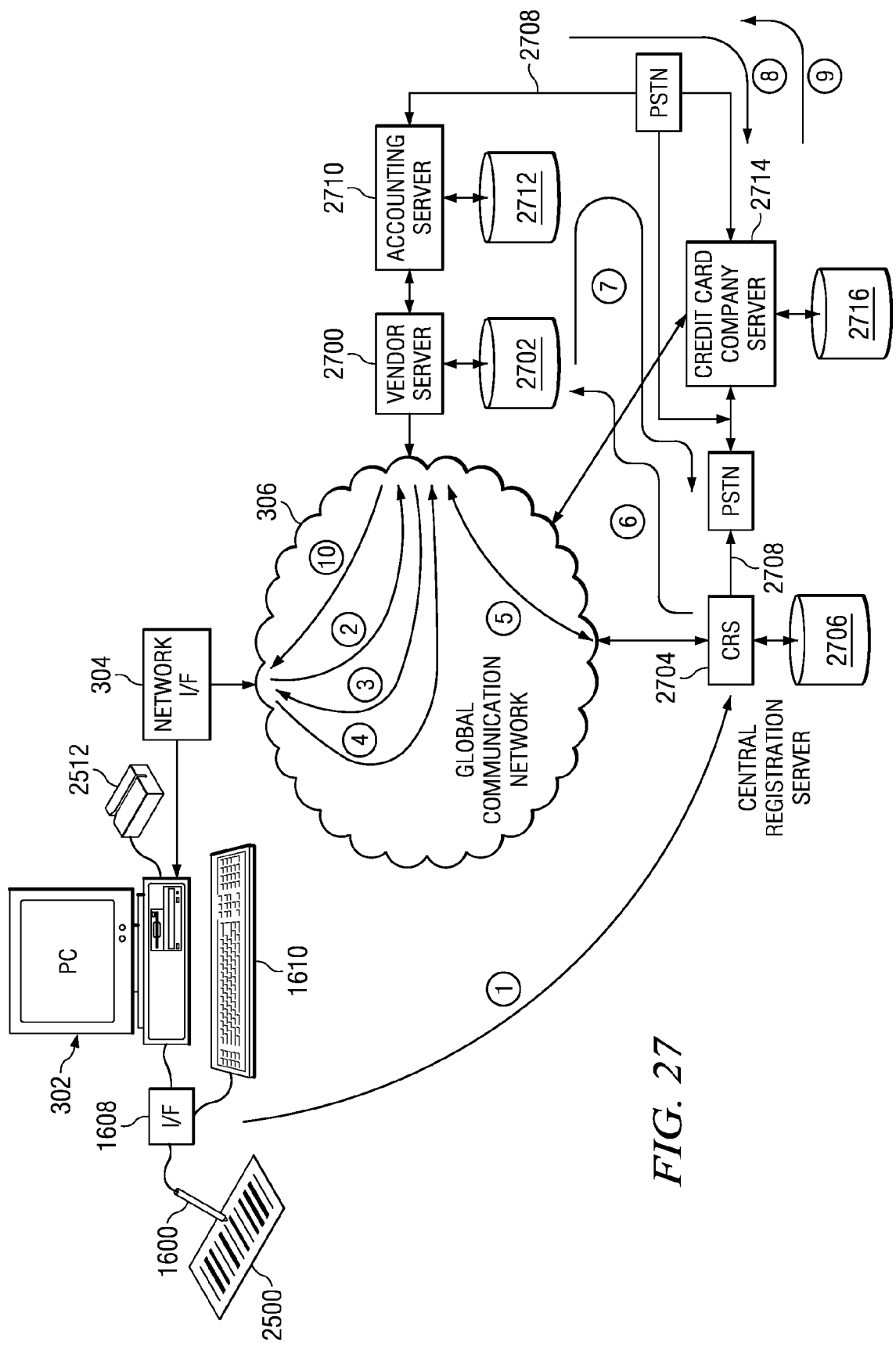
FIG. 27 illustrates system block diagram of an on-line transaction according to a disclosed embodiment.

Referring now to FIG. 27, there is illustrated a system block diagram of an on-line transaction according to a disclosed embodiment. After completing the registration process as mentioned hereinabove along a secure path ① (using the U.S. postal system or the public switched telephone network (PSTN)), the user then goes on-line and accesses a vendor server 2700 disposed on the GCN 306 along a path ②. The user browses the vendor server 2700 for products or services for purchase, and upon selecting one or the other, enters the payment process provided by the vendor server 2700. One option offered by the vendor server 2700 is that the individual may pay according to standard on-line payment practices by providing a credit card information. Alternatively, if the user is reluctant to provide such information over the unsecure network, the disclosed architecture offers an alternative where the vendor may provide that the individual may simply provide the bar code 2500 or unique ID 2502 to complete the payment process. Upon selecting the alternative plan, the vender server 2700 then prompts the user to input the bar code 2500 and/or unique ID 2502 information, as indicated along a path ③.

The user at PC 302 then responds in one of several ways; by scanning the bar code 2500 with a scanner 1600 through an interface unit 1608 into the PC 302. Software running on the PC 302 is operable to receive the scanned bar code information and forwards it to a browser program resident on the PC 302. The browser program then transmits the bar code information in a browser frame which is sent the vendor web site. Note that the software which is operable to receive the scanned bar code information may also interface directly to the GCN 306 for passing information thereacross. Information is then transmitted back to the vendor server 2700 for processing along a path ④. The user may also simply key the unique ID number 2502 into the PC 302 using the keyboard 1610 which is then transmitted by the onboard software through the network interface 304 across the GCN 306 to the vendor server 2700. Furthermore, the user may simply use the credit card 2504 which was issued with the bar code 2500 placed thereon, and swipe it through the credit card swipe unit 2512 which then transmits the bar code 2500 and unique ID 2502 information into PC 302 across the network 306 to the vendor server 2700. The vendor server 2700 then obtains information from a vendor database 2702 which is associated therewith, which indicates that the bar code 2500 and/or unique ID 2502 information should be routed to a central registration server (CRS) 2704 also disposed on the GCN 306.

The CRS 2704 is operable to receive the bar code/unique ID information along a path ⑤ and perform a matching operation with information stored on a CRS database 2706. The CRS 2706 contains all the profile information obtained from the user upon registration. After matching the bar code/unique ID with the user profile information contained in database 2706, the profile information is transmitted over a secure network back to the vendor server 2700, as indicated by a path ⑥. The profile information is then inserted into the on-line payment form automatically for the customer, who can now view this information from his or her PC 302. As discussed in more detail hereinbelow, the inserted information may all be encoded (unintelligible to the user) or only portions of the information is encoded (e.g., credit information). This secure path ⑥ is over, for example, the PSTN 2708 to a back-office accounting server 2710 in close association with the vendor server 2700. The back-office accounting server has an accounting database 2712 which stores all accounting files of the vendor. (Note that the vendor server may request the bar code/unique ID information from the CRS 2704 over the secure PSTN 2708, as indicated by path ⑦.)

In either case, the accounting server 2710 then obtains the primary credit card information and performs a credit authorization function back across the secure PSTN network 2708 along a path ⑧ to a credit card company server 2714. The credit card server 2714 is shown as connected to the GCN 306, but in some cases may not be connected thereto. The credit card server 2714 has associated therewith a credit card database 2716 which provides a cross-reference of the credit card number with the user account and all of the credit information of the user. Upon successful credit verification of the user, this information is transmitted back along a path ⑨ over the secure PSTN network 2708 to the back-office accounting server 2710 of the vendor. The back-office server 2710 then performs the necessary accounting processes to charge the amount of the product/services purchased to the appropriate credit account of the user, and also assigns and forwards an order number to the user PC 302 along a path ⑩. The user may use the order number to track the purchase and to reference the order if any future problems or questions arise. Note that where the user provides more than one credit card in the user profile information, the vendor back-office server 2710 may access more than one credit company server 2714 (only one credit card server shown) to complete the payment transaction, since most credit card companies do not issue more than one card to the same customer.

Figure 28:
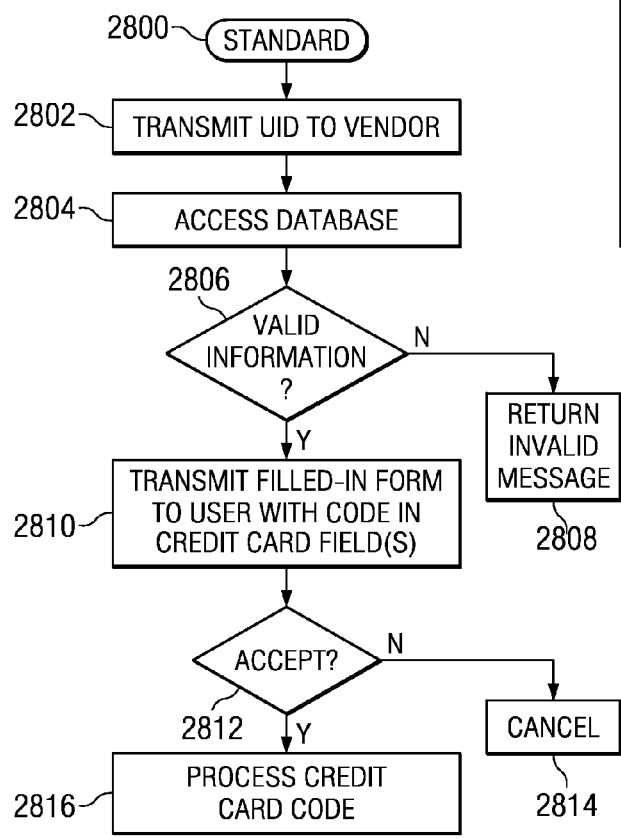
FIG. 28 illustrates a flowchart for a standard payment transaction using the unique user ID.

Referring now to FIG. 28, there is illustrated a flowchart for a standard payment transaction using the unique user ID. Flow begins at a start block 2800 and proceeds to a function block 2802 where the customer transmits the bar code 2500 and/or unique ID 2502 to the vendor web server 2700. Flow continues to a function block 2804 where the vendor server 2700 accesses the CRS server 2704 to obtain the user profile information stored thereon and associated with the unique user ID 2502. The matching operation is performed, as indicated in decision block 2806, to determine if the unique ID 2502 has any matching user profile information. If not, flow is out the "N" path to a function block 2808 where a message is returned to the vendor and ultimately to the user indicating that the transaction was invalid. Otherwise, flow is out the "Y" path to a function block 2810 where the personal information is returned to the vendor over the secure PSTN 2508 and inserted into the vendor's payment form. The filled-in form is then transmitted to the user with a coded information inserted into the credit information fields to protect the sensitive information associated with the users credit card account. Flow is then to a decision block 2812 to determine if the user has accepted the transaction. If not, flow is out the "N" path to a function block 2814 which indicates that the user has canceled the transaction. If the user decides to accept the transaction, flow is out the "Y" path to a function block 2816 where the vendor processes the credit card codes for payment of the selected products or services.

Figure 29:
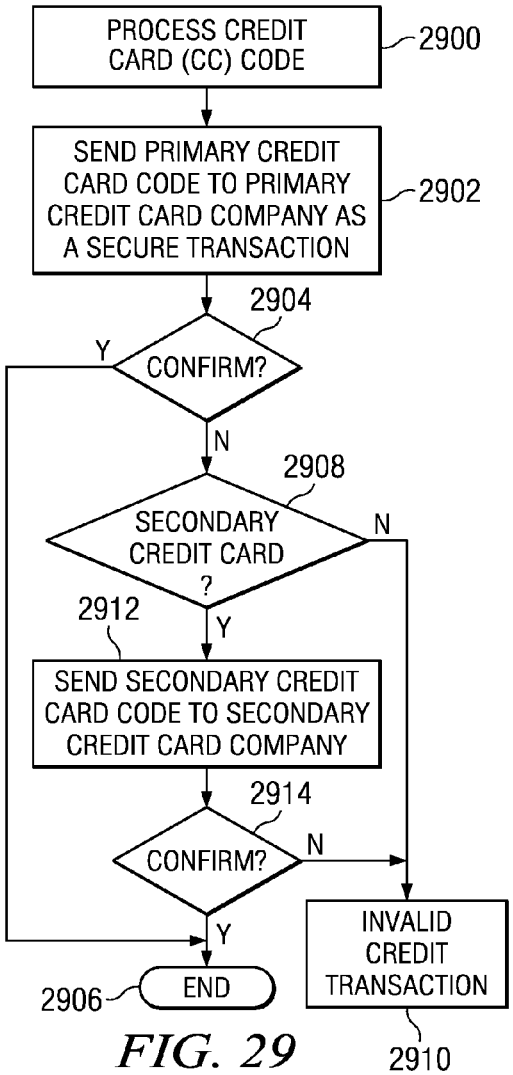
FIG. 29 illustrates a flowchart for processing the credit card code according to the standard transaction.

Referring now to FIG. 29, there is illustrated a flowchart for processing the credit card code according to a standard transaction. Flow begins at a start block 2900 and moves to a function block 2902 where the primary credit card code information is sent to the primary credit card company over secure lines. The secure lines are typically in the form of the PSTN 2708. Flow is then to a decision block 2904 to determine if the credit card information provided in the vendor form is valid and whether it is sufficient to cover payment of the selected products or services. If so, flow is out the "Y" path to end block 2906 where the transaction is processed and completed. If not, flow is out the "N" path to a decision block 2908 to process the purchase transaction using the secondary credit card information provided by the user in the profile information. If the user has not provided secondary credit card account information, flow is out the "N" path to a function block 2910 where invalid credit transaction occurs along with some messaging sent back to the vendor to indicate that the transaction has failed.

If the secondary credit card is provided, flow is out the "Y" path of decision block 2908 to a function block 2912 where the secondary credit card code is sent to the secondary credit card company for decoding and processing. Flow is then to a decision block 2914 to determine if the secondary credit card account has sufficient funds to cover payment of the products and services. If not, flow is out the "N" path to the function block 2910 where an invalid credit transaction occurs and appropriate messaging is provided. On the other hand, if the secondary credit card account is sufficient to cover the transaction, flow is out the "Y" path of decision block 2914 to the end block 2906 where the transaction is processed and completed.

Referring now to FIG. 30, there is illustrated a flowchart of the process for an invisible form transaction. Flow begins at a starting point 3000 and moves to a function block 3002 where the user transmits the unique ID and/or bar code to the vendor in response to selecting a method of payment. The vendor server 2700 receives the unique ID from the user at the user PC 302 and accesses the CRS database 2704 having the unique ID in association with profile information of the user, as indicated in function block 3004. As mentioned hereinabove, the user completed a form with information which comprises personal information, ship-to address, and credit information (usually credit card account information). (Note that the credit information may also include checking account data which would allow for direct deduction of the purchase price from the user checking account according to current practices.)

Flow is then to a decision block 3006 where the CRS server 2704 performs a matching operation with the unique user ID 2502 (and/or bar code 2500) and the CRS database 2706 to arrive at the user profile information. If no match is found, flow is out the "N" path to a function block 3008 where a message is returned to the vendor to the effect that no match was found for the unique ID. Otherwise, if a match was found, flow is out the "Y" path to a function block 3010 where the user profile information is transmitted back to the vendor server 27000 over the secure PSTN 2708 and inserted into the appropriate fields of the vendor payment form. However, using this particular payment method, the inserted information is "invisible," in that, all fields have alphanumeric text inserted therein which is unintelligible to a person who looks at the form. The form also provides an order number which the user may reference for future inquiries related to the purchase transaction. This form with invisible personal information is then transmitted over the GCN 306 to the user as a record of the transaction. Flow is then to a decision block 3012 where the user is offered the option to accept the transaction. If not, flow is out the "N" path to a function block 3014 where the transaction is canceled. Otherwise, the user chooses to accept the transaction, and flow is out the "Y" to a function block 3016 where the transaction is processed according to the particular credit card account information provided.

Referring now to FIG. 31, there is illustrated a flowchart of the credit card account processing for the invisible payment method. Flow begins at a starting point 3100 and moves to a function block 3102 where the vendor server extracts the credit card account information from the user profile information received over secure lines from the CRS server 2704. As mentioned hereinabove, when first completing the user profile information form, the user was asked to submit primary and secondary credit card account information. In this way, if the first card was invalid, the second credit card account will probably cover the transaction. Therefore, the vendor server extracts the primary credit card account information and processes it by transmitting it to the appropriate credit card company server 2714 over a secure communication network (e.g., the public switched telephone network 2708).

The credit card company then performs a confirmation process to determine if the user of the card has a valid account, as indicated in decision block 3104. If so, flow is out the "Y" path to a function block 3106 where the credit card company receives the field information from the vendor back-office server 2710 across the PSTN 2708, and processes the transaction. Flow is then to an end block 3108 where the transaction is completed. On the other hand, if the user is not confirmed to have a valid account at the primary card company, flow is out the "N" path to a decision block 3110 to process the second credit card provided in the user profile information. If the user failed to provide secondary credit account information, flow is out the "N" path of decision block 3110 to a function block 3116 to process the transaction as an invalid transaction.

If the user provided secondary credit account information, flow is out the "Y" path to a function block 3112 where the vendor server 2700 extracts the secondary credit card information and transmits it to the secondary credit card company server (not illustrated in FIG. 27), again over the secure PSTN 2708 mentioned hereinabove. The second credit card company performs a confirmation process to determine if the user has a valid account, as indicated in decision block 3114. If confirmed, flow is out the "Y" path to the end point 3108, where the transaction is processed and completed. If the second credit card account is invalid, flow is out the "N" path of decision block 3114 to the function block 3116 where the transaction is processed as an invalid transaction, and the appropriate messaging provided to the vendor and user indicating as such.

Referring now to FIG. 32, there is illustrated a flowchart of the selection process for a standard and invisible transaction. Flow begins at a starting point 3200 and moves to a function block 3202 where the user accesses the vendor server 2700 to potentially select products and/or services for purchase. Flow is to a function block 3204 where the user selects the purchase. Flow is to a function block 3206 where the user selects the disclosed payment method, and inputs the unique ID and/or bar code for transmission to the vendor server 2700. The means of input may be by scanning the associated bar code 2500, keying in the unique ID number 2502 using a computer keyboard 1610, or by passing the credit card 2504 having the bar code through the swipe card unit 2512. The user then transmits the unique ID 2502 to the vendor server 2700, as indicated in function block 3208. The user then has the option of selecting a standard form transaction or an invisible form transaction, as indicated in decision block 3210.

If the user selects the standard form transaction, flow is out the "N" path to a decision block 3212 where the vendor server 2700 has transmitted the user credit information to the appropriate credit card company and, with flow out the "N" path, awaits for return of the confirmation message. With the return of the confirmation message, flow is out the "Y" path to a decision block 3214 where the user is given the option of accepting or rejecting the transaction. If rejected, flow is out the "N" path to a function block 3216 where the transaction is canceled. If accepted, flow is out the "Y" path to a function block 3218 where the user transmits the acceptance signal back to the vendor, who then processes the transaction. Flow is then to an end point 3220. If, on the other hand, the user selects the invisible form transaction, as indicated in decision block 3210, flow is out the "Y" path to a function block 3222, where coded information is returned to the vendor for insertion into the electronic form being returned and presented to the user PC 302. Flow is then to the decision block 3214 where the user is offered the option to accept or reject the transaction, and follows the illustrated paths, as discussed above.

Figure 33:
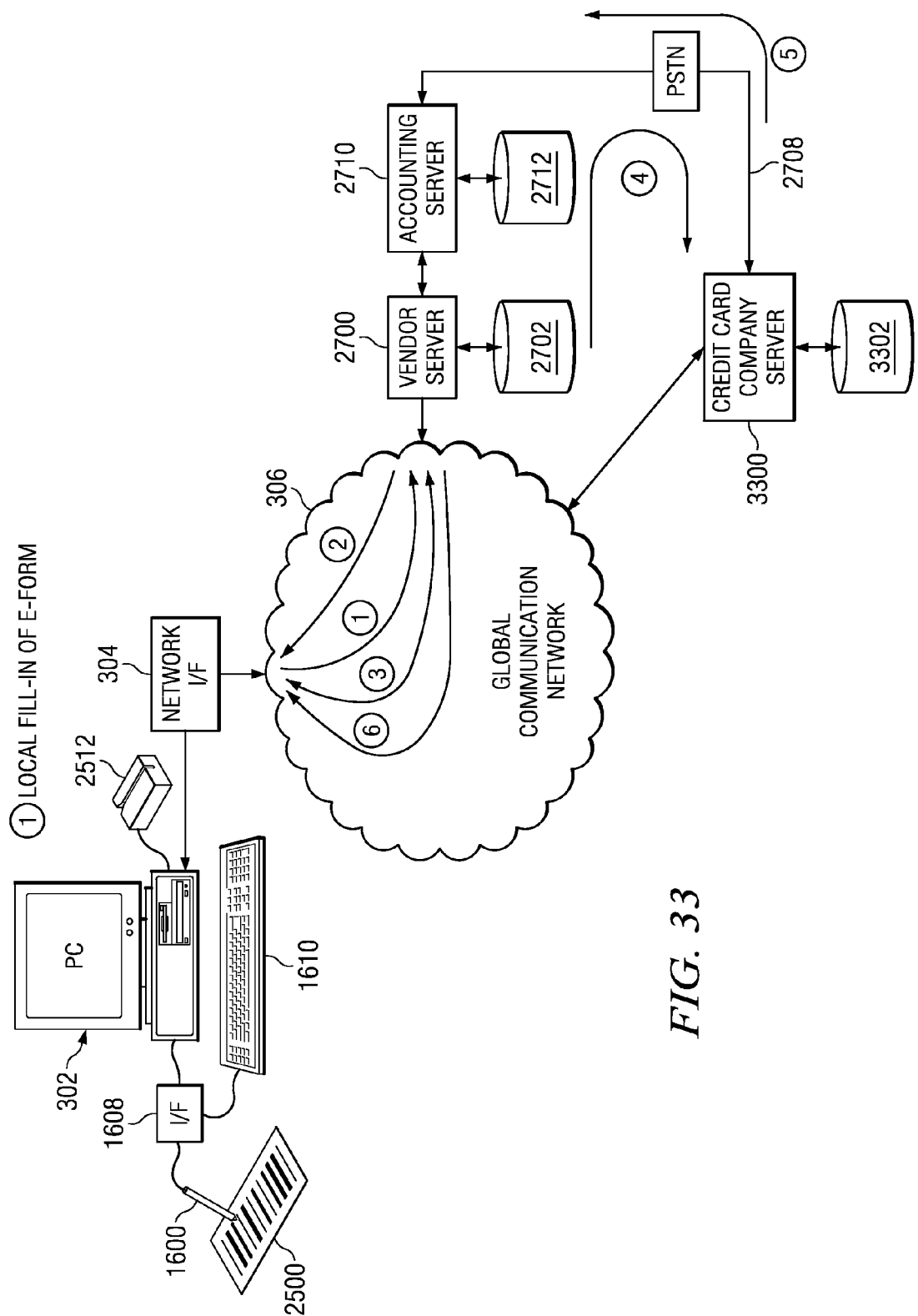
FIG. 33 illustrates a system block diagram of an alternative embodiment where the user profile information is stored at a credit card company system.

Referring now to FIG. 33, there is illustrated a system block diagram of an alternative embodiment where the user profile information is stored at the credit card company, as opposed to a CRS server 2704, as discussed hereinabove. The profile information is provided directly to the credit card company (e.g., VISA® or MASTERCARD®) over a secure network (e.g., the PSTN 2708) in response to the user taking advantage of an offer to obtain a credit card. A credit card server 3300 has an associated database 3302 which contains all users and account numbers having a VISA® card. Alternatively, the database 3302 may contain the names and accounts of all users who have a MASTERCARD®. The software program hosting the profile information is issued to the user having a unique bar code and a unique ID number. When the user requests a credit card from, for example, VISA®, the credit card company requests the unique ID number, and retains the unique ID number and profile information in its database 3302. Therefore, when the user accesses the vendor server 2700 along a path ①, selects products and/or services for purchase, and selects the disclosed payment method, the vendor server prompts the user for the bar code/unique ID, as indicated along a path ②.

The vendor, in this particular embodiment, also queries the user for the type of card to use (e.g., VISA® or MASTERCARD®). The user inputs the bar code/unique ID information according to methods disclosed hereinabove, which is then transmitted back to the vendor server along a path ③. If the user indicated that a VISA® card is to be used, the vendor connects to the VISA® card company server 3300 over secure lines (a path ④) and requests user profile information associated with the transmitted unique ID. The credit card server performs a matching operation with the database 3302 of profile information and transmits the profile information back to the vendor back-office system 2710 along a secure path ⑤. As mentioned hereinabove, the information is then inserted and presented to the user along a path ⑥ according to whether he or she selected a standard or invisible form method.

Figure 34:
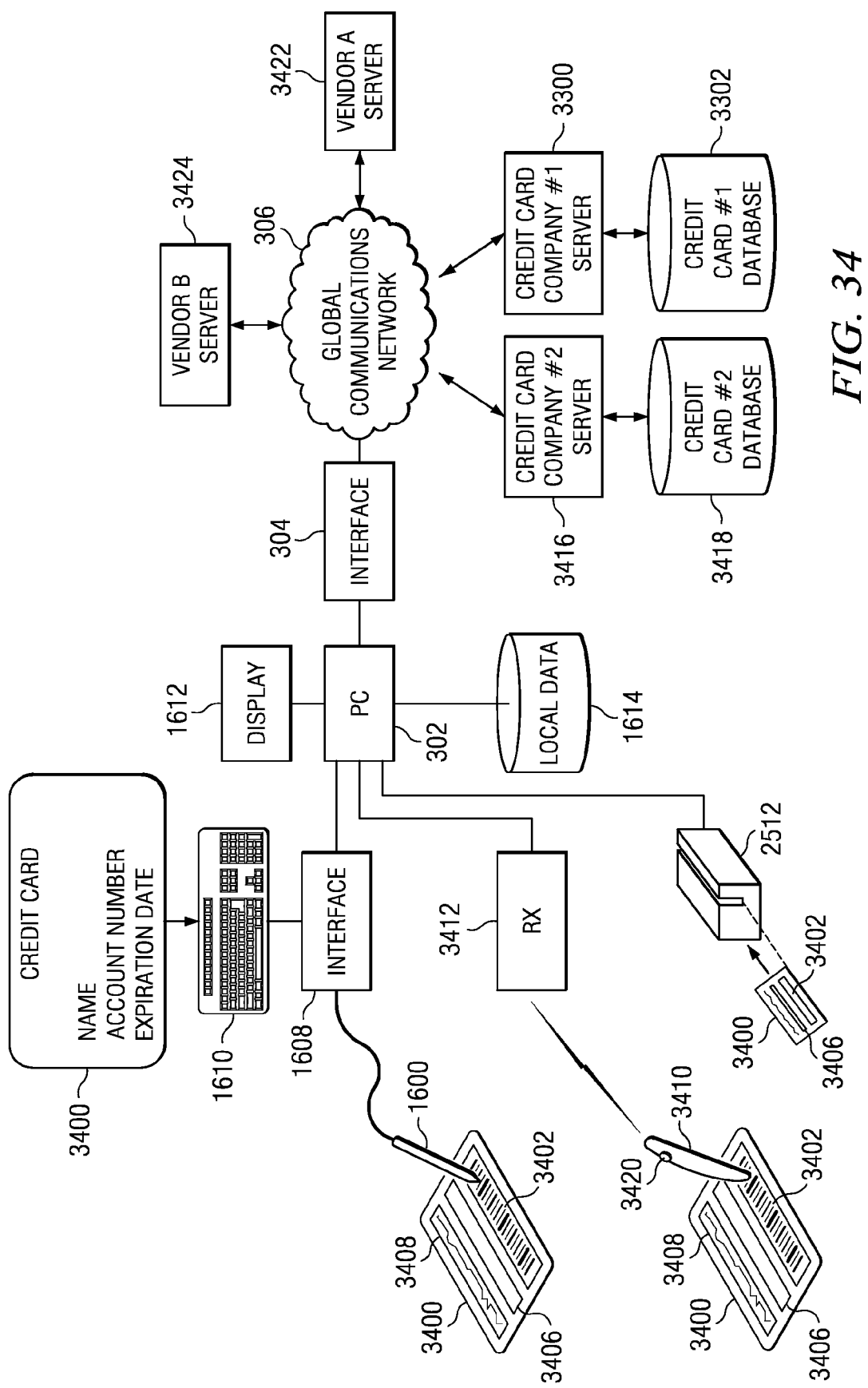
FIG. 34 illustrates a system block diagram of a disclosed embodiment using local database.

Referring now to FIG. 34, there is illustrated a system block diagram of a disclosed embodiment using a local database. The disclosed system is operable to retrieve and present to the credit card owner, e.g., via display on a computer, credit card account information from a credit card server disposed on a network (e.g., a global communication network) in response to the user at a user location scanning or reading a machine resolvable code (MRC) from a credit card of the user. Furthermore, the retrieved credit card account information contains graphical icons which are hypertext links to respective vendor sites of purchases recorded in the account information. The user can then make a further purchase by selecting the appropriate vendor icon to complete the purchase through the desired product from the vendor web site.

This first embodiment is distinguishable from some prior embodiments in that the intermediary servers (e.g., the ARS 308 or the CRS 2706) are not implemented. When the user first signs up with the credit card company to obtain the company credit card, the user is required to provide certain personal and credit information in order to qualify for receiving the credit card. This information is then assigned a unique code which is attached thereto or provided in close associated with the credit card once issued to the user. The unique code is encoded within an MRC 3402 (which the bar code 2500 is one example thereof, but any type of readable MRC is contemplated, using audio, wireless transfer of information, infrared transfer of information, etc.) on the credit card 3400. The credit card 3400 also has associated therewith a magnetic strip 3406 which contains information encoded therein according to the conventional use of the credit card. It can be appreciated that the magnetic strip 3406 may also contain the unique code. Also on the back of the credit card 3400 is text 3408 which is conventional on a standard credit card for providing toll-free access numbers in case of loss or theft, and other information.

In this first embodiment, the user has a computer (i.e., the PC 302) located in his or her home and simply reads the MRC 3402 with the hardwired reader 1600, which reader communicates to the PC 302 through the interface 1608. The interface 1608 then appends routing information extracted from database 1614 in a lookup operation (described hereinabove) to the scanned MRC information which is then input to a communication program running on the PC 302 (e.g., a browser). The browser then uses the appended routing information to forward the unique code data through the interface 304 across the GCN 306 to the credit card company server 3300 (similar to credit card company server 2714), the appended routing information being the network address of the credit card server 3300 on the GCN 306. The credit card server 3300 then extracts the unique code and performs a matching operation on its associated database 3302. The unique code is then matched with the user's personal account information, which personal account information is then returned back across the GCN 306 to be presented to the user on the display 1612 of the PC 302.

The displayed account information also contains vendor-related graphical icons each of which are associated with particular line item transaction purchases from the vendors indicated on the icons. Each of these icons are hyperlinked to a corresponding vendor server disposed on the GCN 306. The credit card account information can be presented to the user in the form of an HTML document. The HTML document source code contains the addresses associated with each of these hyperlinked vendor icons along with the credit card account information such that when the user selects (or "clicks") on a vendor icon, the corresponding network address hyperlink information is processed by the browser to connect to the vendor server and return the associated product information for presentation to the user on the display 1614 of the PC 302.

Alternatively, each vendor icon could be linked to the credit card company server 3300 such that the credit card server database 3302 contains the updated network addresses corresponding to the vendor icons displayed as part of the user credit account information. The server 3300 would then retrieve and return from the database 3302 the correct and updated links which are sent back to the browser of the PC 302 for ultimate connection to the appropriate vendor server 3422. For example, if a line item was related to the purchase of towels from a Vendor A, the user could simply click on a Vendor A graphical icon closely associated with the line item. This user action would automatically connect the user PC 302 to that Vendor A web server 3422 disposed on the GCN 306, and more specially, to a web page providing further information about the specific brand and model of towel the user purchased. Similarly, should the user choose to view vendor information related to a second line item transaction from a Vendor B, the user would click on the associated Vendor B graphical icon which would then automatically return to the user PC 302 information retrieved from a Vendor B server 3424 also disposed on the GCN 306. The user can also select the "BUY" option to make further purchases of respective products from the vendor web site 3422.

It can be appreciated that, in more sophisticated scenarios, the personal credit account information retrieved from the credit card server 3300 is in the form of an audio format such that, when returned from the credit card server 3300 to the user PC 302, the audio information is presented to the user using the multimedia audio system of the PC 302. However, more complex speech recognition techniques would need to be implemented for the user to cause the user PC 302 to automatically connect in response to voice commands to one or more vendor web sites associated with particular line item transactions listed in the credit card account information. In this first embodiment, the interface 1608 and reader 1600 are provided by the credit card company having the credit card company server 3300 such that the interface 1608 has embedded therein the appended routing information (i.e. network address) of the credit card server 3300.

The appended routing information may also be contained in software on the PC 302 such that, when the user first registers for the credit card, and/or manually accesses the credit card company web site to enable features according to one or more disclosed embodiments, the credit card company requires the user to download software from the credit card company server 3300 to be installed on the PC 302 for any subsequent automated reading transactions using the MRC 3402. The downloaded software would then provide the appended routing information or network address of the credit card server 3300 in association with the unique code extracted from the scanned MRC 3402 of the credit card 3400. The user would then scan the MRC 3402 of the credit card 3400, which thereafter the software running on the PC 302 would extract the unique code and match the unique code with the appended routing information such that a message packet would be assembled with the unique code and transmitted directly to the credit card server 3300 for return of the associated personal credit account information of the user.

Additionally, since the software can be proprietary in nature when provided by the credit card company, and the software could be modified to apply specifically to the customer, the unique code need not be transmitted to the credit card company server 3300. This is facilitated by the use of URL addresses. A URL address provides the domain name address which identifies the location of the server database 3302 on the GCN 306, and the appended file path information of the URL address identifies the exact location of the user account information on the server database 3302. The downloaded credit card software, in this embodiment, is then preconfigured to include the exact location of the user account information, precluding the need to send the unique code of the user to the server 3300. Therefore, once the unique code is extracted from the MRC 3402, the unique code is processed by the downloaded credit card software to match it with the correct user account information. This is necessary since it is conceivable that the user may have more than one account with the same credit card company. Alternatively, in a home computer environment, the home may have more than one individual living therein with a credit card from the same credit card company. The credit card software is then required to discern from several credit cards having corresponding unique codes at the same home address, in order to properly assign the correct URL address for returning the appropriate user account information.

In a second embodiment, a wireless reader 3410 is disclosed which, when activated using a read enable button 3420, reads the MRC 3402 of the credit card 3400 and automatically transmits the unique code information to a compatible receiver 3412 connected to the PC 302. The transmission mechanism used in this embodiment can be RF (radio frequency) transmission, or an infrared (IR) transmission scheme, or any other communication protocols used for wireless transmissions. The PC 302 then receives the transmitted signal via the receiver 3412 and extracts the unique code. The unique code is used to obtain the corresponding URL address of the credit card server 3300 which points to the personal account information of the user. The URL address of the credit card server 3300 is obtained by using the unique code in a matching operation on the local database 1614 which contains the association of the unique code to the URL address of the credit card server 3300 in a relational database such as a lookup table (LUT). The URL address of the credit card server 3300 is then inserted in the communication program running on the PC 302 which automatically connects the PC 302 to the server 3300, the server 3300 returning the personal account information to the user PC 302 in response thereto. The user is then free to make further purchases or to view product information.

Alternatively, the unique code could be transmitted to the server 3300 along with a less detailed URL network address of the server 3300 such that the unique code is required to complete retrieval of the personal account information.

Routing information (or network address information) of the credit card server 3300 is then appended by the PC 302 to the unique code using software running on the PC 302 which contains such information. A message packet comprising the unique code and the appended routing information is then inserted into a communication program and transmitted through the interface 304 across the GCN 306 to the credit card server 3300, the appended routing information being the network address of the credit card server 3300. The unique code is then extracted by the credit card server 3300 and used in a matching operation in the database 3302 to return the user's personal credit account information back across the GCN 306 for presentation to the user on the display 1612, or according to other methods of presentation to the user as disclosed hereinabove. In any of the disclosed embodiments, in order to provide a more secure method of providing the account information to the user, the user may be prompted to enter a PIN (Personal Identification Number) before the user is granted access to the personal account information.

In another embodiment, the user PC 302 has connected thereto the card swipe unit 2512 which is operable to read one or both of the magnetic strip 3406 and the MRC 3402. If the MRC information is used, the PC 302 is operable to interpret the MRC 3402 and extract the unique code, and operates according to any of the abovementioned scenarios for retrieving the corresponding personal account information, including connecting using only the associated URL network address information of the server 3300, or transmitting the unique code along with the appended network address information to retrieve that same personal credit account information. When the magnetic strip 3406 is read using the card swipe unit 2512, the PC 302 is operable to interpret the information recorded therein, typically being the credit card account number. The PC 302 would then use software to match the credit card number with routing information such that the credit card number is routed across the GCN 306 to the credit card server 3300 corresponding to the network address of the appended routing information. The credit card account number is then used to obtain the personal credit account information from the credit card server database 3302 for return and presentation to the user on the display 1612 to facilitate further purchases or the viewing of product information.

Alternatively, the unique code of the MRC 3402 may be encoded within the magnetic strip 3406 such that when the card swipe unit 2512 is used to read the magnetic strip 3406 the unique information is obtained therefrom and used to retrieve the personal account information from the database 3302 for presentation on the display 1612. It can be appreciated that the magnetic strip includes not only the credit card account number of the user's credit card, and additional information in the conventional sense, but also the unique code, such that the user can selectively choose which number will be used for transmission across the unsecure GCN 306 (although this feature is not an important feature for this embodiment, it will provide added security for the embodiment of FIG. 36). Similarly, the MRC 3402 may include the credit card number which is unique among the credit card accounts by that particular credit card company, and typically world wide.

In another embodiment, it can be appreciated that software (e.g., third-party software) may be installed on the PC 302 which recognizes a wide variety of company credit cards to which the user may have subscribed such that when the user uses any of the methods disclosed hereinabove for inputting the unique code information (via the hardwired input device 1600, the wireless input device 3410, or the card swipe unit 2512 or even an encoded audio tone), the MRC data (i.e., the associated one or more unique codes) and/or magnetic strip data is interpretable by the PC 302 software to append the appropriate routing information to connect the PC 302 to the corresponding credit card company server 3300. For example, the user may have a first credit card which personal account information resides on a first credit card company server 3300. This first server 3300 has associated therewith network-based routing information stored within the software such that scanning of the first card by the reader 3410 results in personal account information being retrieved from the first server 3300. A second credit card of the user has corresponding second routing information stored in the software. When the second card is read using the reader 3410, the software appends the corresponding second routing information to the unique code for transmission to a second credit card company server 3416 disposed on the GCN 306 which is at a different location than the first credit card company server 3300. As mentioned hereinabove, the unique code need not be transmitted since the URL network address of the credit card server 3300 can provide all of the detailed address and file path information to point the user PC 302 directly to the corresponding personal account information on the server 3300.

Each of these first and second credit cards may have attached thereto corresponding MRCs which contain an encoded unique code recognizable only by that corresponding credit card company. However, each of the MRCs used by the first and second credit card companies are interpretable by the software on the PC 302 which then appends the appropriate routing information to connect the user PC to its corresponding credit card servers (3300 and 3416).

It can be appreciated that, since the information being transmitted across the GCN 306 is credit information, a number of secure systems can be employed to provide some level of security of the information when it is being transmitted. For example, secure server protocols can be implemented as soon as the request for account information is made by an external source of the credit card company server 3300. Alternatively, and not illustrated, the personal account information can be transmitted back to the user PC via the public switched telephone network (PSTN), as in FIG. 33). This scenario provides a more complicated mechanism for getting the information to the user PC 302 for display, wherein if the user has only a single telephone connection, the user then may be requested to disconnect from their ISP (Internet Service Provider) such that the single telephone line can then be used to transmit the information back to the user over the secure PSTN. The user would then place the PC 302 in a receive mode such that an incoming call would be answered by the PC 302 and the personal account information downloaded for presentation via the display 1612.

The keyboard 1610 is provided such that the user can manually input credit card account information into a user interface of the PC 302 to retrieve the same credit card account information using secure server interface protocols and any of the disclosed methods for returning secure account information. Where the unique code is in the form of a number which can be printed proximate to the MRC 3402, the user can then use the keyboard 1610 to manually input the unique code number into the PC 302 for interrogation and appending of routing information for ultimate connection to the credit card server 3300.

In any of the scenarios disclosed hereinabove, the PC 302 may have a database stored on its local storage system 1614 which has one or more unique codes associated with respective URL addresses of the one or more credit card servers 3300, a relational database. The unique code of the MRC 3402 is extracted by software running on the PC 302 and not transmitted, but used in a matching operation on the database 1614 local to the PC 302. The matching operation returns the URL address of the corresponding credit card server 3300 such that the PC 302 is then automatically connected to the server 3300 in accordance with the returned URL address. The credit card information corresponding to that URL address is then returned and presented to the user via the PC 302. In embodiments disclosed in greater detail hereinbelow, the matching database can also be stored remotely from the PC 302 on an intermediary server system disposed on the GCN 306.

Figure 35:
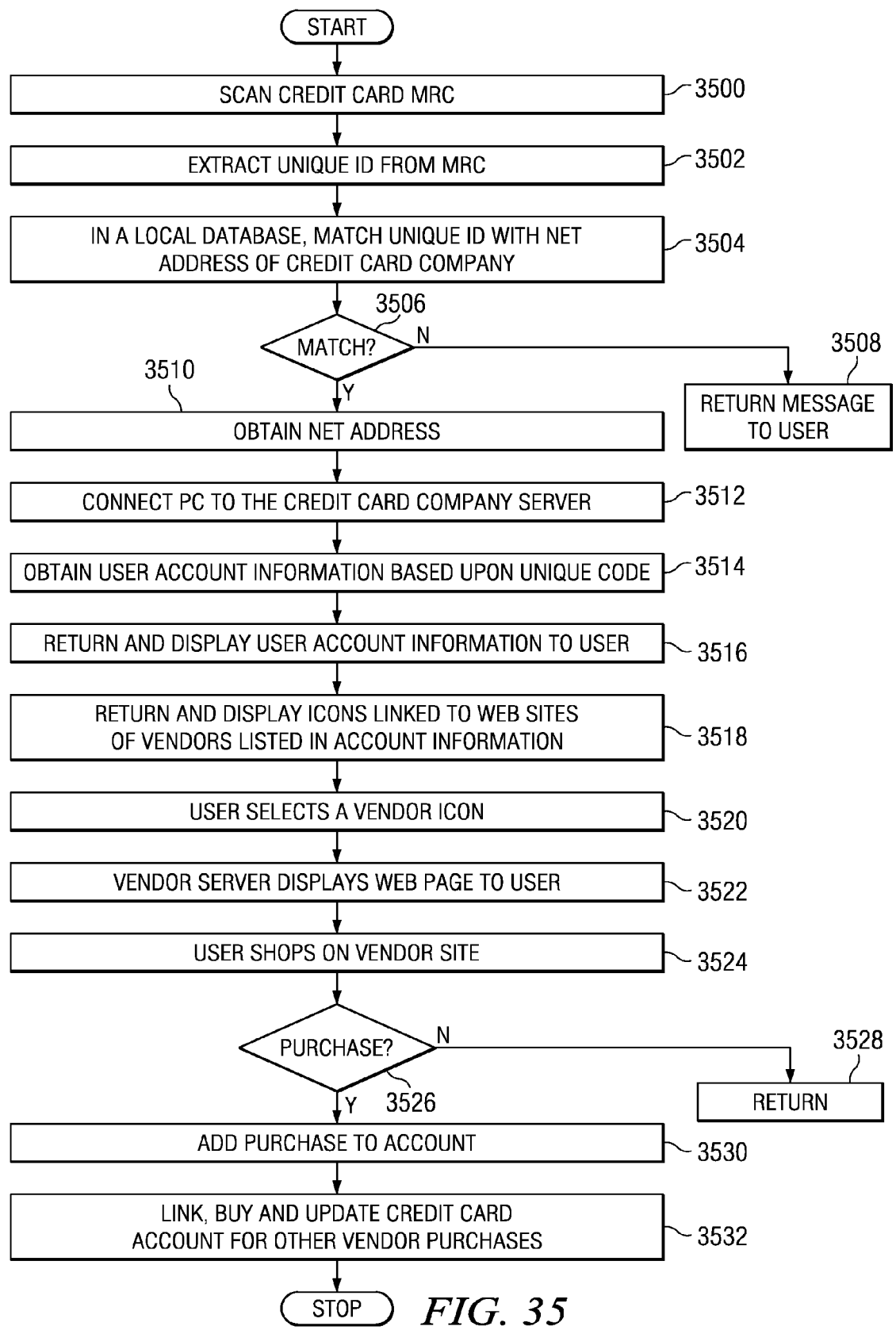
FIG. 35 illustrates a flowchart of the embodiment of FIG. 34.

Referring now to FIG. 35, there is illustrated a flowchart of the embodiment of FIG. 34. Flow begins at a Start point and moves to a function block 3500 where the user reads the credit card MRC 3402 with the input device 1600. The PC 302 then receives the scanned MRC information and extracts the unique code (i.e., the unique ID) from the MRC 3402, as indicated in a function block 3502. Flow is then to a function block 3504 where the PC 302 performs a matching operation in local database 1614, which PC 302 contains software operable to use the extracted unique code to perform a matching operation with information therein which contains the URL network address of the credit company server 3300. Flow is then to a decision block 3506 where, if the matching operation is not successful, flow is out the "N" path to a function block 3508 where a message is returned to the user indicating that the match was unsuccessful and that other action is required.

On the other hand, if the match was successful, flow is out the "Y" path to a function block 3510 where the network address of the credit card server 3300 is returned to the PC 302. The returned network address is the database path information contained in the database which defines the location of the associate personal account information on the credit card company web server database 3302. The returned network address is then inserted into the communication program (e.g., a browser) for transmission to the credit card server 3300 having the appended routing information network address, as indicated in a function block 3512. The unique code could also be transmitted with the routing information to the credit card company server, where the returned network address does not precisely locate the user personal account information, but brings the user to a secure server which requests the unique code separately for access to the personal information. Alternately, the unique code could be transmitted after the connection to the credit card server, and even at the request of the server.

Flow is then to a function block 3514 where the PC 302 connects to the credit card company server 3300 in accordance with the network address information returned from the local database 1614. Flow is then to a function block 3516 where the personal account information is then returned from the credit card server 3300 across the GCN 306 to the user PC 302 for presentation to the user via the display 1612. In addition to the user credit account information being presented to the user, graphical icons hyperlinked to various vendor web sites are also displayed, as indicated in a function block 3518. The user then selects a vendor icon by clicking on it, as indicated in a function block 3520. In a function block 3522, the vendor server 3300 processes the URL address information received from the browser of the PC 302 and retrieves the corresponding information from its database 3302. The vendor server 3300 then displays the account information to the user at the user location in the form of one or more HTML documents. Flow continues to a function block 3524 where the user shops on the vendor web site. Flow is then to a decision block 3526 to determine if the user has made any purchases. If not, flow is out the "N" path to a function block 3528 where the user is returned to a point where the user may select other vendor icons to make further purchase (i.e., the function block 3518) where the user can view the account information and all vendor icons in order to make further purchases. If the user does make a purchase, flow is out the "Y" path of decision block 3526 to a function block 3530 where the purchase is added to the user credit card account. Flow is then to a function block 3532 where the user can continue the process buy linking to other vendor web sites, make purchases, and have the purchase information applied to the user credit card account. Flow is then to a Stop point. It can be appreciated that when the personal account information is returned to the PC 302 for presentation via the display 1612, it can be implemented whereby the user is required to input the PIN to ensure that the personal account information is provided to the appropriate user. This PIN can be the same issued to the user for use when obtaining cash from ATM machines and the like.

Figure 36:
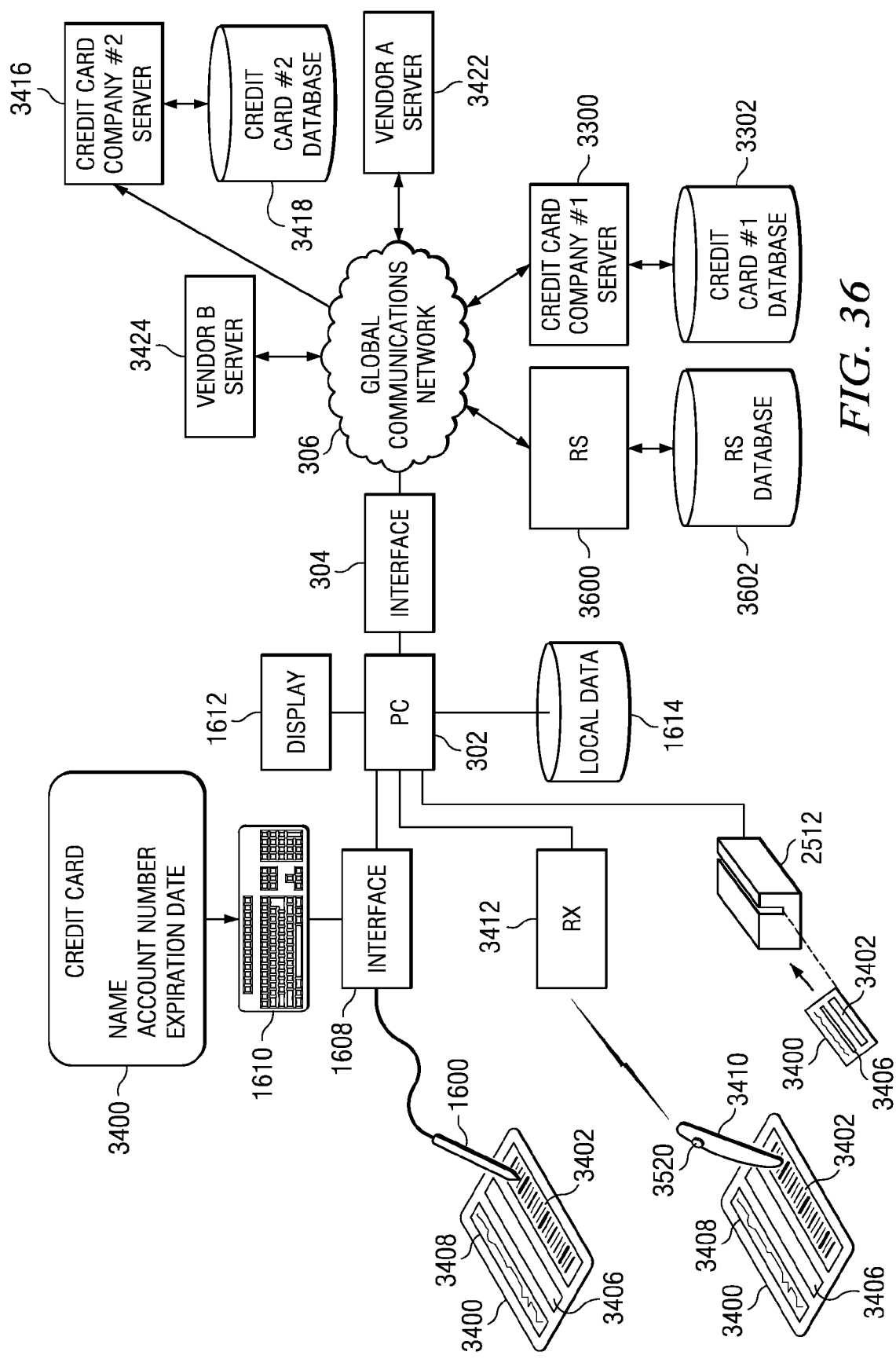
FIG. 36 illustrates a system block diagram using a remote intermediate reference server in place of the local database of FIG. 34.

Referring now to FIG. 36, there is illustrated a system block diagram using a remote intermediate reference server in place of the local database of FIG. 34. In this particular embodiment, the extracted unique code is transmitted via the PC 302 to the remote reference server (RS) 3600 also disposed on the GCN 306 in order to return the URL network address of the corresponding credit card server and account information. In operation, when the user reads the MRC 3402 of the credit card 3400 with the input device 1600, the unique code of the MRC 3402 is extracted by the PC 302 and routing information appended thereto such that the PC 302 connects through the interface 304 across the GCN 306 to the RS 3600. In this particular embodiment, the PC 302 or the interface 1608 (where the input device 1600 is hardwire connected to the interface 1608) contains the routing information which is the network address of the RS 3600. The unique code of MRC 3402 along with the appended routing information is inserted into the communication software such that the PC 302 is automatically connected across the GCN 306 to the RS 3600.

The unique code is transmitted to the RS 3600 to facilitate a matching operation which is performed on an RS database 3602, the RS database 3602 having a relational database and the unique code associated with one or more network addresses of the credit card server 3300. When a successful match occurs, the RS 3600 returns the network address of the credit card server 3300 back across the GCN 306 to the PC 302. The PC 302 then connects back across the GCN 306 to the credit card server 3300 in accordance with the returned address information of the credit card server 3300. The credit card server 3300 then processes the network address further to point directly to the location of the personal account information in accordance with the received network address. The personal account information is then returned from the credit card server database 3302 across the GCN 306 to the PC 302 for presentation via the display 1612. As mentioned hereinabove, security may be enhanced by prompting the user to provide a PIN to ensure that the personal account information has been transmitted to the appropriate user.

As mentioned hereinabove, the displayed account information also contains vendor-related graphical icons each of which are associated with particular line item transaction purchases from the vendors indicated on the icons. Each of these icons are hyperlinked to a corresponding vendor server disposed on the GCN 306. The credit card account information is presented to the user in the form of an HTML document. The HTML document source code contains the addresses associated with each of these hyperlinked vendor icons along with the credit card account information such that when the user selects (or "clicks") on a vendor icon, the corresponding network address hyperlink information is processed by the browser to connect to the vendor server and return the associated product information for presentation to the user on the display 1614 of the PC 302. Alternatively, each vendor icon could be linked to the credit card company server 3300 such that the credit card server database 3302 contains the updated network addresses corresponding to the vendor icons displayed as part of the user credit account information.

The server 3300 would then retrieve and return from its database 3302 the correct and updated links which are sent back to the browser of the PC 302 for ultimate connection to the appropriate vendor server 3422. For example, if a line item was related to the purchase of towels from a Vendor A, the user could simply click on a Vendor A graphical icon closely associated with the line item. This user action would automatically connect the user PC 302 to that Vendor A web server 3422 disposed on the GCN 306, and more specially, to a web page proving further information about the specific brand and model of towel the user purchased. Similarly, should the user choose to view vendor information related to a second line item transaction from a Vendor B, the user would click on the associated Vendor B graphical icon which would then automatically return to the user PC 302 information retrieved from a Vendor B server 3424 also disposed on the GCN 306.

The user selection of a vendor icon from the account information HTML page could cause the PC 302 to connect back to the RS 3600 in order to obtain the latest network URL address information for the corresponding vendor web site, instead of the credit card server database 3302 having such information. The RS database 3602 then stores all of the latest vendor server and product information addresses which are then periodically updated by the vendors.

The operation is similar when using the wireless input device 3410 or the swipe card unit 2510. In either case, the MRC is read by the respective input device such that the unique code is extracted at the PC 302. The PC 302 then appends routing information which is inserted into a communication package for transmission across the GCN 306 to the RS 3600. The RS 3600 then performs a matching operation with records in the RS database 3602 to obtain the credit server network address. The credit card server network address is then returned back across the GCN 306 to the PC 302. The PC 302 then inserts the network address into its communication program and connects across to the corresponding credit card server 3300 to obtain the personal account information from the database 3302.

It can be appreciated that where the user has a variety of credit cards corresponding to different credit card vendors, one or more other credit card servers (3300 and 3416) may be disposed on the GCN 306 such that, when the user reads any of the MRCs 3402 associated with the respective different credit card companies, the unique code will be appended with the routing information which connects the user PC 302 to the RS 3600. The RS database 3602 would then contain an entry for each credit card of the user (i.e., the corresponding unique codes and associated network addresses of the credit company servers) such that when the user reads a particular credit card MRC 3402 with the any one of the input devices (e.g., 3410), the user PC 302 is connected to the corresponding credit server disposed on the GCN 306.

For example, the user may have a first credit card having personal account information which resides on the first credit card company server 3300. This first credit card server 3300 has associated therewith network-based routing information of the credit card server 3300 stored within the RS database 3602 such that in response to the user scanning the first card with the reader 3410, the PC 302 appends routing information of the intermediary RS 3600 to the first unique code. This information, when inserted into the running communication program on the PC 302, causes the PC 302 to connect to the RS 3600. The RS 3600 then performs a matching operation on the RS database 3602 using the first unique code in order to obtain the network address (and account file path information) for the corresponding first credit card server 3300. The network address (and account file path information) is then returned to the PC 302 to provide connection to the first credit card sever 3300. The path file information points directly to the account information of the user, and results in personal account information being retrieved from the first server 3300 and presented to the user by the PC 302.

A second credit card of the user has corresponding routing information of the second credit card server 3416 stored in the RS database 3602. When the second card is read using, for example, the reader 3410, the PC 302 appends routing information of the RS 3600 to the second unique code. Upon connection to the RS 3600 by the PC 302, the second unique code is used in a matching operation to obtain the associated network address (and account file path information) for the corresponding second credit card server 3416. The network address (and account file path information) is then returned to the PC 302 to provide connection to the second credit card sever 3416. The path file information points directly to the account information of the user, and results in personal account information being retrieved from the second server 3416 and presented to the user by the PC 302. In either or both of the aforementioned scenarios, a PIN can be used to further ensure that the user views only his or her personal account information. Furthermore, as illustrated in both FIGS. 27 and 33, the personal account information could be provided to the user via the secure PSTN system.

The disclosed intermediary embodiment is advantageous in that, where the credit card company changes location on the GCN 306 causing its associated network address to change, the credit card company is no longer required to notify all users of the change in network address. The credit card company need only download the respective updated URL address information for each user to the RS database 3602. The change in network address is then transparent to the user, and causes no interruption in service for accessing account information. Where the user reads the actual account number with any of the input devices (1600, 3410 or 2512), the user can also be directed through the RS 3600. The RS database 3602 need only have the additional information of the actual credit card number to facilitate the transaction.

Figure 37:
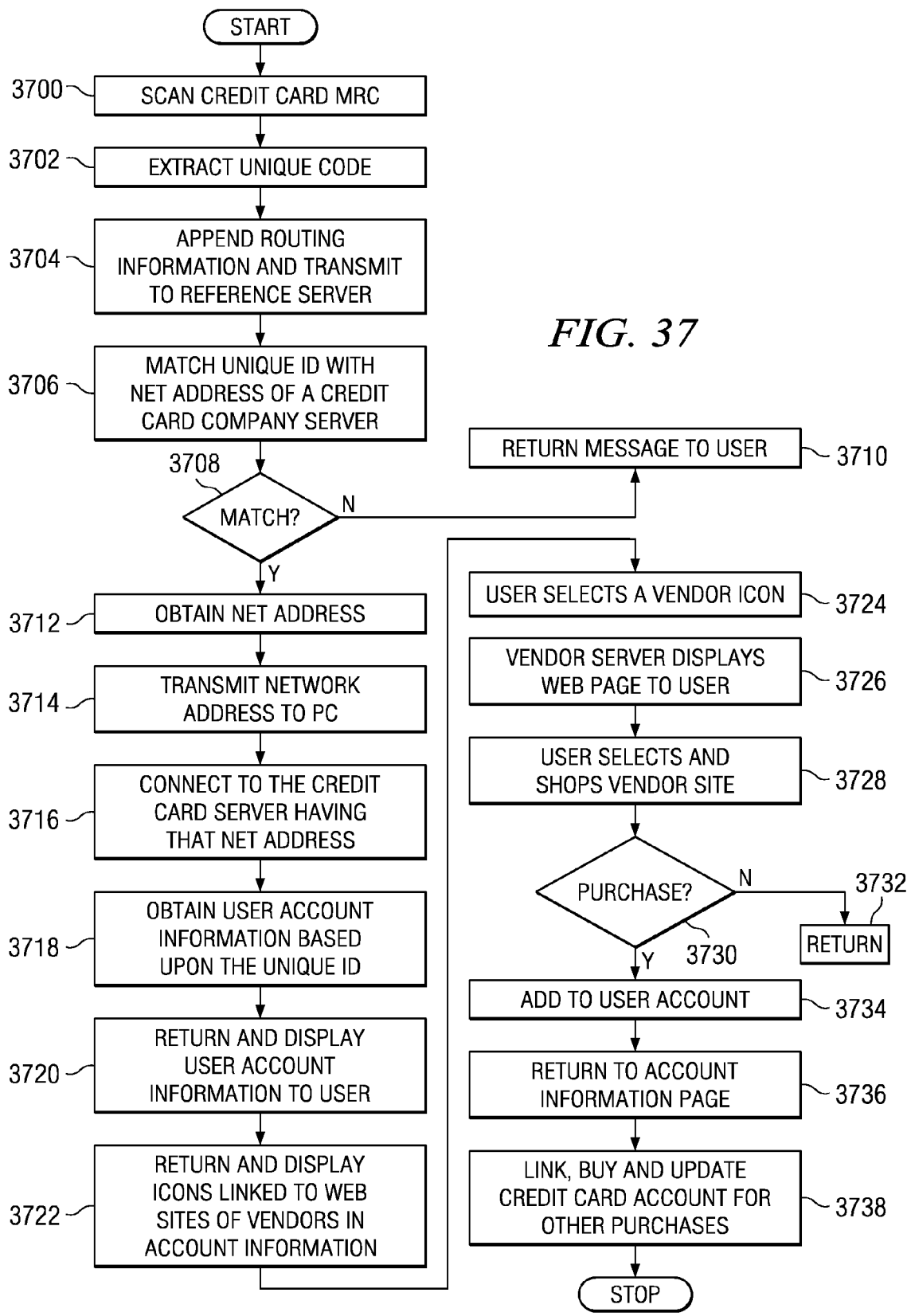
FIG. 37 illustrates a flowchart of the embodiment of FIG. 36.

Referring now to FIG. 37, there is illustrated a flowchart of the embodiment of FIG. 36. Flow begins at a Start point and moves to a function block 3700 where the user reads the MRC 3402 of the credit card 3400. When using the wireless input device 3410 to scan the MRC 3402, the unique code is modulated onto a signal which is transmitted to the receiver 3412 for input into the PC 302. The PC 302 then extracts the unique code therefrom, as indicated in a function block 3702. Flow is then to a function block 3704 where the PC 302 appends routing information to the unique code and transmits the unique code to the RS 3600, which routing information corresponds to the network address of the RS 3600. Flow is then to a function block 3706 where the RS 3600 uses the unique code to perform a matching operation on records stored on the RS database 3602. The matching operation encompasses returning an associated network address of the corresponding credit card server 3300 disposed on the GCN 306.

Flow is then to a decision block 3708 where, if a successful match has not occurred, flow is out the "N" path to a function block 3710 where a message is returned to the user to that the match was unsuccessful and other action is required. If a successful match has occurred, flow is out the "Y" path to a function block 3712 where the network address (and path information of the user account) of the credit card server 3300 is obtained. At this point, the network address of the credit card server 3300 is transmitted back to the PC 302. It can be appreciated that the transmission of the unique ID back to the PC 302 is not necessary, since the PC 302 already has the unique ID available. The PC 302 then processes the returned network address of the credit card server 3300 and inserts it into the communication program for transmission to the corresponding credit card server 3300, as indicated in a function block 3716. The credit card server 3300 then processes the file path information portion of the network address to return the corresponding personal account information of the user from the database 3302, as indicated in a function block 3718. Flow is then to a function block 3720 where the personal account information is then returned to the PC 302 and presented to the user via the display 1612.

In addition to the user credit account information being presented to the user, graphical icons hyperlinked to various vendor web sites are also displayed, as indicated in a function block 3722. The user then selects a vendor icon by clicking on it, as indicated in a function block 3724. In a function block 3726, the vendor server 3300 processes the URL address information received from the browser of the PC 302 and retrieves the corresponding information from its database 3302. The vendor server 3300 then displays the account information to the user at the user location in the form of one or more HTML documents. Flow continues to a function block 3728 where the user then selects a vendor icon, and shops the vendor web site. Flow is then to a decision block 3730 to determine if a purchase has been made. If not, flow is out the "N" path to a function block 3732 to return the user to a point where the account information can then be viewed again (i.e., function block 3722) along with the vendor icons to make further purchases. If so, flow is out the "Y" path of decision block 3730 to a function block 3734 where the user purchase is added to the user credit card account. Flow is then to a function block 3736 where the user is returned to the account information page so that further purchases can be made. The user can then link to other vendor web sites, make purchases, and have the purchase information applied to the credit card account, as indicated in a function block 3738. Flow is then to a Stop point. It can be appreciated that when the personal account information is returned to the PC 302 for presentation via the display 1612, it can be implemented whereby the user is required to input the PIN to ensure that the personal account information is provided to the appropriate user. This PIN can be the same issued to the user for use when obtaining cash from ATM machines and the like.

Referring now to FIG. 38, there is illustrated a database structure of a disclosed embodiment. As disclosed hereinabove, the MRC 3402 contains the unique code (ID) which uniquely identifies the user personal account information provided when the user applied for the one or more credit cards. Therefore, at a minimum, the database includes the unique code 3800 of the corresponding credit card, and the associated network address (and account file path information) 3802. In a further implementation, the credit card company can require the entry of the PIN by the user. As mentioned hereinabove, the user could be required to manually enter the PIN prior to the account information being released. Alternatively, the associated PIN 3804 could be provided in the RS database such that it is automatically transmitted to the credit card server 3300 via the PC 302 when the user scans the MRC 3402. The actual credit card number 3806 may also be stored in the RS database 3302 and associated with the credit card network address 3802 such that reading of such information automatically routes the user account information to the PC 302. In still another implementation, the username 3808 and expiration date information 3810 may be included to ensure protection of the returned account information. Information for additional credit cards may also be used (PIN #2 3812, Account #2 3814, expiration date #2 3816, and associated network address (file path information)) 3818.

Referring now to FIG. 39, there is illustrated a general block diagram of the wireless portable input device 3410 in operation with the PC 302. This is a general block diagram of the components of the portable input device 3410 which may contain more or less components to fulfill the desired functions of the input device 3410. Input device 3410 incorporates a CPU 3900 for handling all onboard monitoring and control functions of the unit. Attached thereto is a memory 3902 for storing unique codes of the one or more scanned MRCs 1606 (similar to MRC 3402) which are associated with products and product information. Also connected to the CPU 3900 is the input device head 3904 which incorporates all the emitter/detector electronics for reading MRC data 1606. In more complex implementations, the head 3904 can also read magnetic media. The read enable button 3420 is used to initiate or enable scanning of MRC information into the memory 3902 of the input device 3410.

In one embodiment, where the user is proximate to the PC 302 and in viewing range of the display 1612, the wireless portable input device can be operated in an automatic mode such that confirmation of the successful reading of the MRC 3402 is provided by the substantially immediate presentation of the retrieved information associated with the MRC 3402 to the user via, for example, the display 1612. In automatic mode, the user is still required to press the read enable button 3420 to allow input of the MRC data into the wireless input device 3410, but is not required to manually press a transmit button 3906 on the wireless input device 3410 to transmit the one or more unique codes extracted from scanned MRCs 3402.

In another embodiment, the user has chosen to store the one or more scanned MRCs 3402 in the wireless input device 3410 in lieu of automatic transmission to the PC 302. This embodiment is applicable where the user can be remote from the PC 302, for example, in a retail store. Upon seeing an item or piece of information of interest, the user presses the read enable button 3420 and scans the corresponding MRC 3402 located on the product or associated with the information of interest, and stores the unique codes in the memory 3902 of the wireless input device 3410. In response to a successful scan of the one or more MRCs 3402 in this scenario, one or more read confirmation indicators 3908 are provided which can output, for example, a light, or an audio signal (e.g., a beep), etc. When the user returns to a location proximate to the PC 302, or within communication range of the receiver 3412, the user can then depress the transmit button 3906 which causes the CPU 3900 to retrieve the MRC data and the input device ID data from the memory 3902, and pass it to a modulator 3910, which modulator 3910 prepares the data for transmission through a transmitter 3912 across an antenna 3914 to a receiving antenna 3916 attached to the receiver 3412. The receiver 3412 may be assembled in conjunction with a demodulator 3920 for demodulating the modulated signal received from the input device 3410. The demodulator 3920 and receiver 3412 also may be in a single unit internal to the PC 302. The display 1612 is provided with the PC 302 to display product or web page information to the user. The input device 3410 can also include an alphanumeric display 3922 which connects to the CPU 3900 for allowing the user to scroll through scanned MRCs, and if desirable, to selectively delete any MRCs related to products the user no longer wishes to purchase. A battery 3924 connects to the CPU 3900 and provides power to all onboard electronics.

Where the user has stored MRC data related to a number of credit cards, the wireless input device display 3922 can be used allow the user to select which credit card company web site to access. For example, if three unique codes associated with three different credit card companies were input to the wireless device 3410, the user can now scroll through the stored unique codes to select which one of the three credit card company web sites he or she wishes to access. Of course, the nomenclature presented to the user via the device display 3922 would have some meaning which clearly indicates to the user the associated credit card company. After selection, the user then presses the transmit button 3906 to initiate display of the associated account information according to one or more disclosed embodiments.

In another embodiment, the wireless input device 3410 (or any of the other devices—1600 and 2512) contains a single embedded device ID which is associated with a single credit card company. In the instance of the wireless input device 3410, the user can read and store multiple MRCs 3410 associated with products or other information which the user may wish to ultimately review and potentially purchase, in addition to having the device ID permanently stored therein. If the user wishes to make a purchase of a product which has its unique code stored therein, but is unsure whether there are sufficient funds in the credit card account associated with the input device 3410 to make the purchase, the user can then press the transmit button 3906 to automatically retrieve the credit account information for immediate display 1612. After determining that there are or are not sufficient funds, the user can then take the appropriate action to either purchase or nor purchase the product. Notably, this single-embedded-device-ID feature facilitates use of the wireless input device with the PC 302 being the user's personal at-home computer, or a remote retail computer which is operable to accommodate the disclosed architecture. For example, if the user were at a local kiosk store, and had stored the unique codes of one or more products for purchase, he could then approach the retail computer and press the transmit button to automatically display his credit account information at that location.

In still another embodiment, the wireless input device 3410 can contain both the MRC data of products for purchase, and the unique codes of one or more credit cards, such that the user can select any or all of products to purchase, and which credit card account to access, and potentially charge against, the selection process being facilitated by the use of the device display 3922 and/or a computer display at the retail store or at home.

Figure 40:
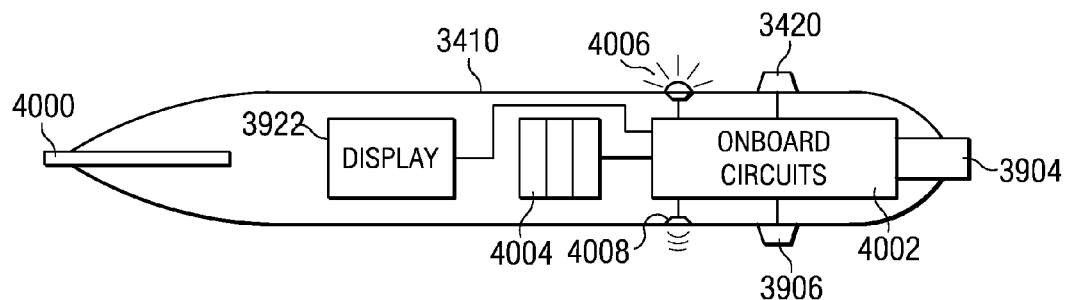
FIG. 40 illustrates a physical cross-section diagram of the portable input device in the shape of a pen.

Referring now to FIG. 40, there is illustrated a physical cross-section diagram of the portable input device 3410 in the shape of a pen. The input device 3410 comprises a standard writing portion 4000 for use as a writing instrument when not used as a reading device. Furthermore, the input device 3410 also comprises read head electronics 3904 located at the opposite end of the writing portion 4000. The read head 3904 extends partially outside the surface of the input device 3410 for scanning MRCs 1606. (Notably, the read head electronics 3904 could also be partially recessed in the case shell to provide some protection of the read head electronics 3904.) Also contained within the input device 3410 are onboard circuits 4002 which contain the memory 3902, the CPU 3900, the modulator 3910, transmitter 3912, and antenna 3914. The alphanumeric display 3922 also connects to the onboard circuits 4002 to display information corresponding to the scanned MRCs 3402. The onboard circuits 4002 interface to a battery structure 4004 (similar to battery 3924) which provides onboard power for portable use of the wireless input device 3410. Attached to the onboard circuits 4002 are the read indicators 3908 which comprise, for example, an LED 4006 and/or a speaker 4008 for providing some confirmation that the MRC 1606 has been properly scanned. Also connected to the onboard circuit 4002 is the read enable button 3420, and the data transmit button 3906 for enabling transmission of the stored MRC data and input device ID information to the PC 302.

Referring now to FIG. 41, there is illustrated a basic data signal sent from the scanner 3700 to the PC 302. The MRC data can be automatically transmitted without user intervention (i.e., pressing the trigger button 3702) such that MRC data is transmitted in regular intervals. The illustrated signal indicates that $MRC_1$ data is being transmitted three times, followed by $MRC_2$ data, etc. Similarly, were the user to transmit the MRC data by pressing the trigger button 3906, the MRC data could also be automatically sent in triplicate in response to a single press of the trigger button 3906. Other transmission schemes can be incorporated to meet the requirements of a particular environment, for example, the MRC data may only need to be sent in duplicate, or four times, etc. As will be described hereinbelow, this is for the purpose of ensuring that the MRC data is delivered and received by the PC 302 accounting for transmission problems inherent to some wireless systems.

Figure 42:
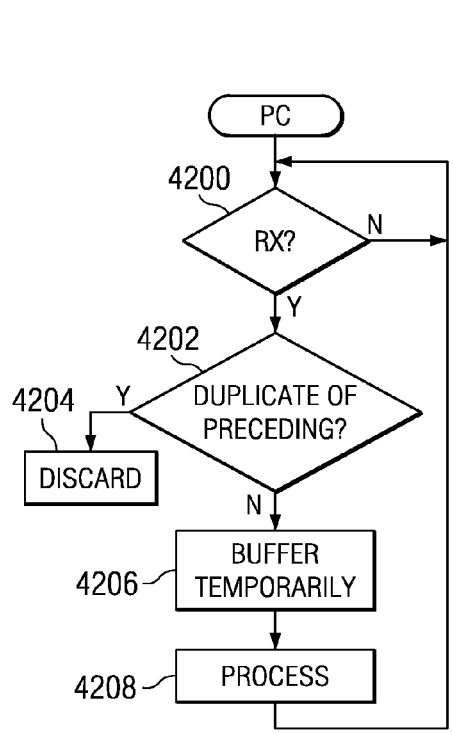
FIG. 42 illustrates a flowchart of the signal interrogation process by the PC.

Referring now to FIG. 42, there is illustrated a flowchart of the signal interrogation process by the PC 302. The PC 302 is operable to continuously monitor for a transmitted signal from the input device 3410. Therefore, flow is first to a decision block 4200 to monitor any incoming transmissions. If no transmissions are received, flow is out the "N" path back to the input of the decision block 4200 to continue monitoring. If a transmission is received, flow is out the "Y" path to another decision block 4202 to determine if the received MRC data packet is a duplicate of an already-received MRC data packet indicating a retransmission. If so, flow is out the "Y" path to a function block 4204 where the duplicate data is discarded. On the other hand, if the received MRC data is not a duplicate of the preceding MRC data packet, flow is out the "N" path to a function block 4206 where the new data is buffered temporarily prior to processing, as indicated in a function block 4208. When finished processing that particular MRC data, flow loops back to the input of the decision block 4200 to continue monitoring for transmissions from the input device 3410.

Figure 43:
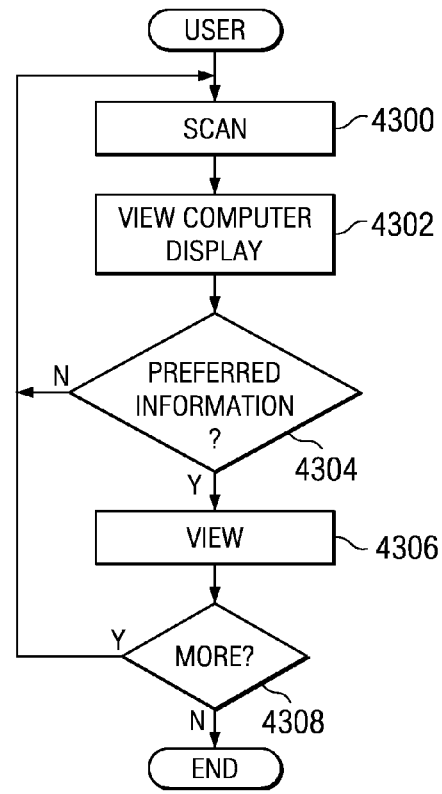
FIG. 43 illustrates a flowchart of the MRC data processing from the perspective of the user.

Referring now to FIG. 43, there is illustrated a flowchart of the MRC data processing from the perspective of the user when proximate to the PC. Flow begins at a function block 4300 where the user reads the MRC 3402 of a credit card with the input device 3410. Flow is then to a function block 4302 where the MRC data is automatically transmitted from the input device 3410 such that the PC 302 receives the transmitted MRC data and retrieves the credit account information corresponding to the scanned MRC data of a credit card, according to one or more disclosed embodiments. Flow is then to a decision block 4304 to determine of the displayed account information is that which the user wishes to view. If not, flow is out the "N" path back to the input of the function block 4300 to continue the scanning of another MRC 3402 related to a different credit card. If so, flow is out the "Y" path to a function block 4306 where the user simply views the account information for as long as he or she desires. Flow continues on to another decision block 4308 where the user decides to view more MRC-related account information of yet another credit card. If so, flow is out the "Y" path to the input of the function block 4300 to scan more MRCs 3402. If not, flow is out the "N" path where the user ceases scanning anymore MRCs 3402, and the process reaches an End point.

In operation, the user holds the pen input device 3410 and will utilize the associated reading capabilities to read the one or more MRCs 3410 of credit cards. When the user reads the MRC 3410, the user will view the display 1612 and expect the display 1612 to "jump" to the appropriate web site (i.e., a change in information currently being viewed on the display 1612). This operation involves, transparent to the user, the launching of the web browser associated with the PC 302 in addition to interpreting the MRC 3402 (which may be a bar code) and determining the routing information therefrom to connect to the appropriate web site. However, in one embodiment, the only scan confirmation feedback the user will get is that associated with the jumping to a new page in accordance with the routing information associated with the PC 302. In order to facilitate this communication operation utilizing a wireless link, there must be some type of mechanism in place to ensure that the MRC 3402 has been delivered to the PC 302. This is facilitated by utilizing the transmission of multiple codes. This requires the scanner 3700 to store the code and then transmit the MRC code a number of times. The PC 302 and the associated underlying program can interpret this by only accessing the web site based upon the first received code.

Of course, the input device 3410 could be utilized in a manner where the code was immediately transmitted upon scanning. The primary feedback that the user is provided is that associated with the display jumping to the appropriate web site. The user will scan the MRC 3402 and look at the information displayed on the display 1612 and, if it does not jump to the web site (as usually perceived by the user), the user will scan the MRC 3402 again. Audible feedback is very typical with scanners that have audible alerts associated therewith. This audible alert indicates that the scan was complete. This is facilitated on the present wireless input device 3410 (and also the input device 1600 and the swipe card unit 2512) utilizing the audible transducer 4008. This visual feedback of the display 1612 jumping to the web site completes the operation of scanning, wirelessly transmitting, and viewing the desired information.

Figure 44:
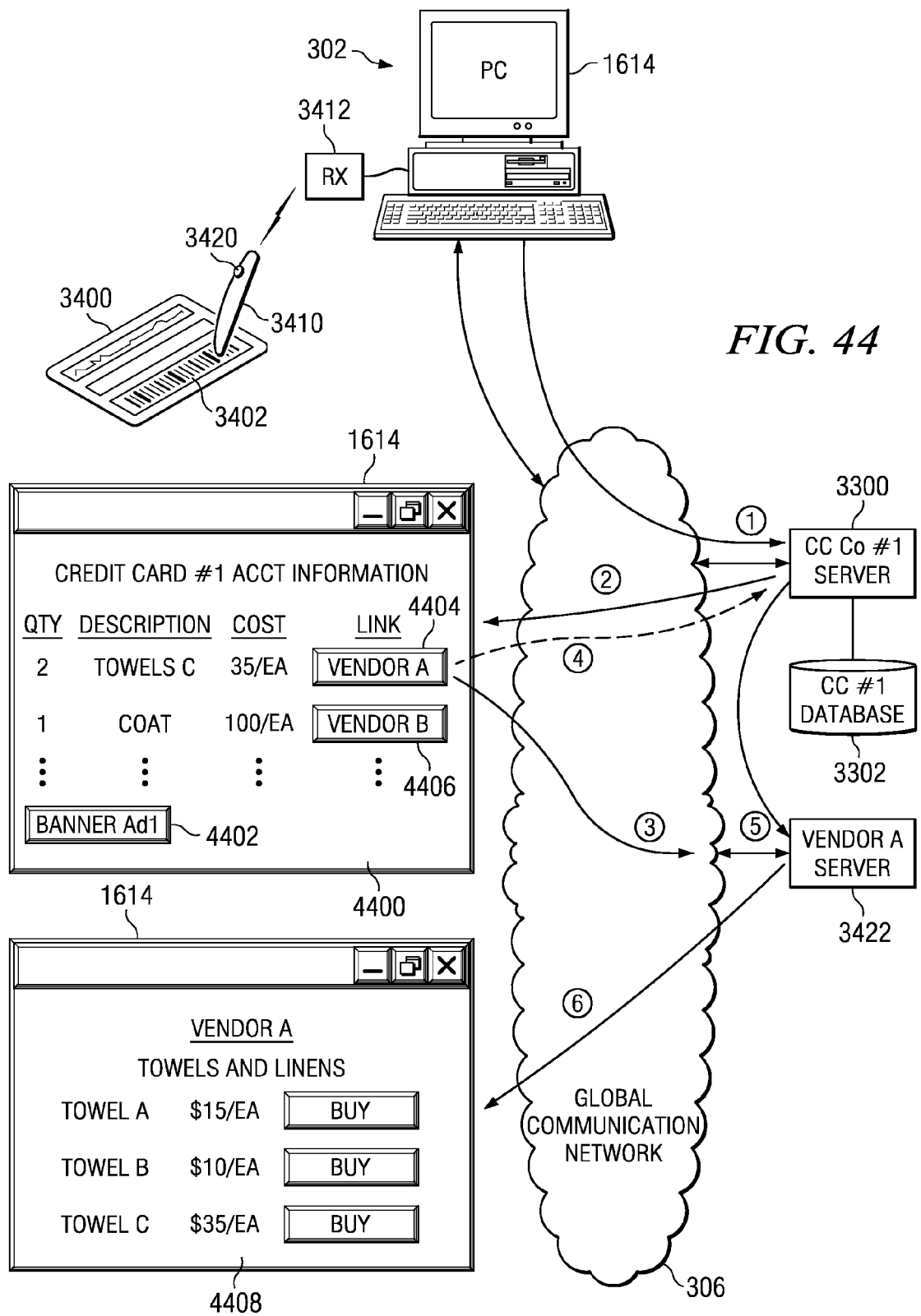
FIG. 44 illustrates a simplified flow diagram of a disclosed embodiment utilizing the wireless input device and the database local to the PC.

Referring now to FIG. 44, there is illustrated a simplified flow diagram of a disclosed embodiment utilizing the wireless input device and the database local to the PC. The user scans the MRC 3402 on the credit card 3400 of the user by enabling the read function button 3420 of the wireless input device 3410. The unique code embedded therein is transmitted to the PC 302 via the receiver 3412, which PC 302 then extracts the unique code. The PC 302, disposed on the GCN 306, performs a lookup operation in its local database (not shown) and obtains the corresponding URL network address of the credit card company server 3300 disposed on the GCN 306. The returned URL address is then inserted into the browser running on the PC 302, and connects the PC 302 across a path ① through the GCN 306 to the credit card sever 3300. The credit card server database 3302 is then accessed to provide the personal account information to the credit card server 3300 for presentation across a path ② to the user, e.g., via the display 1614. The personal account information is presented to the user as an HTML document 4400 in the viewport of the display 1614 to the user. The document 4400 comprises most fields of information common to standard hard-copy statements, e.g., item Description, Cost, and perhaps the quantity (QTY) of individual items purchased, and transaction number of a particular purchase (not shown) which is unique to the credit card company. The displayed document 4400 may also have one or more banner advertisements 4402 in addition to the account information.

In this particular embodiment, the personal account information document 4400 also includes a Link heading which indicates to the user that a vendor icon 4404 that is provided in association with each purchase transaction can be selected to connect the user with a web page which displays the item purchased in that line item transaction, or other information. Alternatively, the link could display to the user items similar to the purchased item if the purchased item is no longer being manufactured. When the credit card account information page is assembled by the credit card server 3300 prior to transmission to the PC 302, all of the embedded hyperlink information related to the vendor icons causes the latest vendor hyperlink address to be retrieved. These hyperlink addresses could be stored locally, in a first instance, in the credit card server database 3302, or in a second instance, at another location such as the RS database 3602 (not illustrated). In the first instance, the credit card server database 3302 is accessed to obtain all of the latest vendor icon hyperlink information for transmission to the PC 302 as part of the HTML account document 4400. Therefore, when the user selects a Vendor A icon 4404, the PC 302 connects directly to the Vendor A server 3422 via a path ③ in accordance with the hyperlink information in the HTML document 4400. In the second instance, the PC 302 communicates back to the credit card server 3300 via a path ④, and then to the Vendor A server 3422 along a path ⑤.

In any case, the information corresponding to the user selected vendor icon 4404 obtained from the Vendor A server 3422 is presented to the user via the display 1614, along a path ⑥. A vendor-provided HTML page 4408 is presented via the display 1614 of the PC 302 having the information related to the purchased product associated to the user-selected Vendor A icon 4404. For example, the vendor document 4408 displays a variety of related products, e.g., towels (Towel A, Towel B, Towel C, etc.) including the type of towel (Towel C) purchased in the transaction list in the account page 4400. The user is then offered the opportunity to view information related to that particular item, or other related or non-related products.

Figure 45:
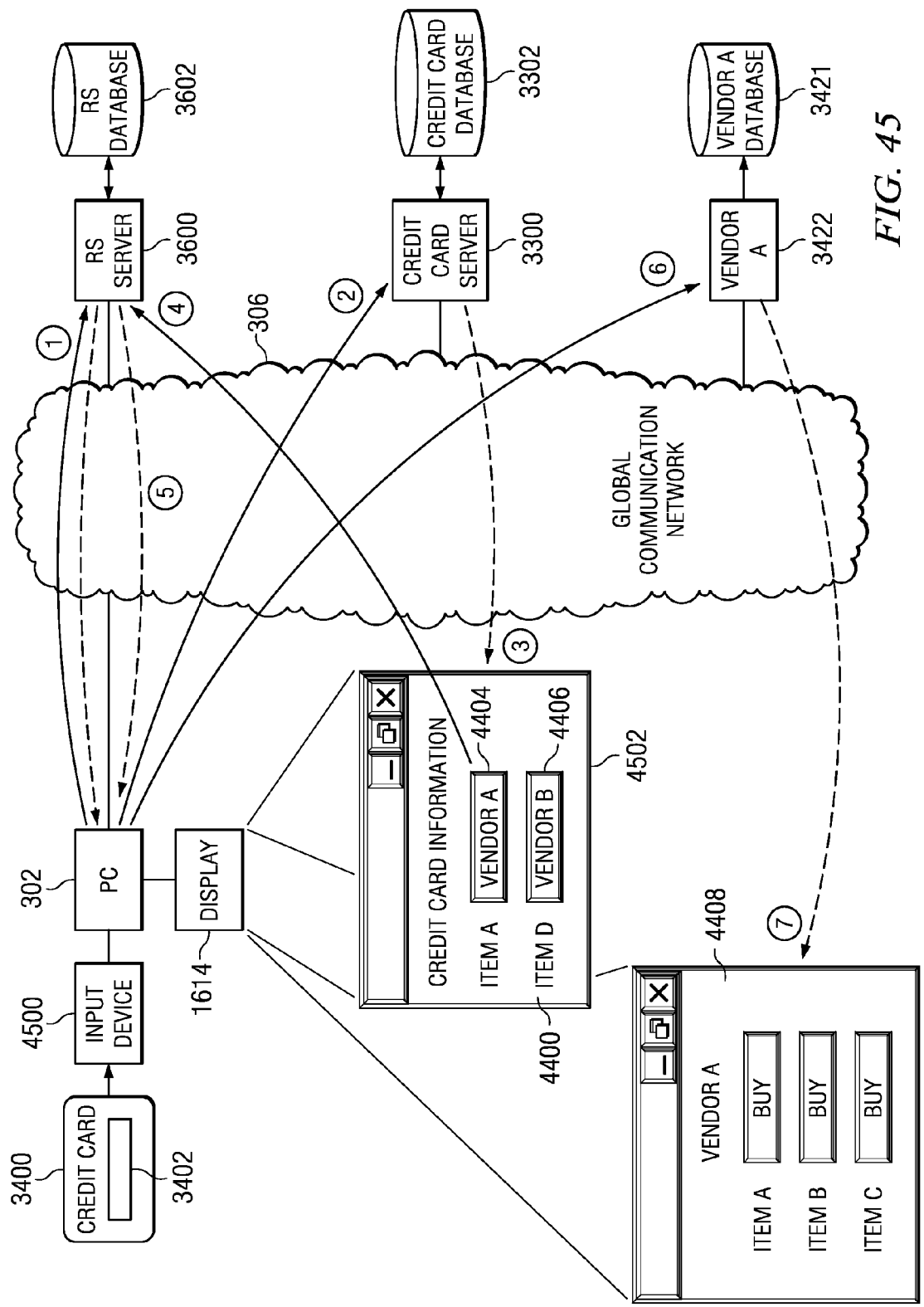
FIG. 45 illustrates a diagrammatic of an alternate embodiment of the embodiment of FIG. 44.

Referring now to FIG. 45, there is illustrated an alternate embodiment of the embodiment of FIG. 44. The credit card 3400 is scanned into the PC302 for output on the display 1614. This is facilitated through an input device, labeled block 4500. This is very similar to the input device 3520 of FIG. 35 and also FIG. 44. The operation is similar to that described in FIG. 44, except that this particular embodiment utilizes the intermediate RS server 3600 and its associated relational database 3602. In the initial step, as indicated by a first path "①," the PC recognizes the unique code 3402 on the credit card 3400 as being associated with the background software in the PC302, this being the proprietary software of the disclosed system. Once recognized as a system unique code, this code is then transferred to the RS server 3600 for a look up operation in the RS database 3602. If a match occurs, the network address of the credit card server 3300 is returned and then a connection made through a path "②" to the credit card server 3300 to retrieve information from the associated database 3302 and returned along a path "③" back to the PC 302 to provide the first HTML document 4400 for display on the display 1614. This, as described with respect to FIG. 44, is the personal credit card information which has embedded therein the vendor locations 4404 and 4406. The context of each HTML document 4400 then presents this information to the user in a textual manner such that it is recognized by the user. When the user "clicks" on either one of the locations 4404 Or 4406, the PC 302 is directed to return to the RS server 3600. Information is transmitted along a path "④" in the form of a unique vendor code which is unique to the particular vendors, this unique vendor code having been embedded in the information returned from the credit card server 3300. Therefore, it is necessary to perform a second lookup in the database 3602 to determine the network location of the vendor, either Vendor A or Vendor B. This network address is then returned to the PC 302 on a path "⑤" and then a connection made to the Vendor A server 3422 to interface with its database 3421. Information is then returned on a path "⑦", as was discussed hereinabove with respect to path "⑥" of FIG. 44 and the operation therein. Utilizing this embodiment of FIG. 45, the credit card server 3300 does not have to maintain information regarding the location of Vendor A on the network; rather, this information is maintained in the database 3602. By utilizing this central storage of network addresses, updated addresses can always be maintained. Further, from a commercial transaction standpoint, traffic on the network can be tracked by the server 3600 acting as an intermediary and transaction billing can be made to either the credit card server 3300 or the Vendor A server 3420; for example, it may be that the credit card server 3300 has a revenue sharing plan wherein it will share in any "hits" made as a result of presenting this information to the user. If the network address were merely provided as a hyperlink in the document 4400, this would not allow the credit card server 3300 to realize any revenue sharing from redirections made to Vendor A server 3422. Further, by utilizing intermediary database in the RS server 3600, this allows a centralized server to provide for revenue sharing.

In application of the disclosed embodiment, the MRC 3402 that is disposed on the personal access device or credit card 3400 (it being noted that this could be in the form of a machine resolvable code, an audio tone, or even embedded magnetically on the magnetic strip with credit card information) allows the user to obtain information associated with their personal account. In that the disclosed architecture is not restricted to home computers systems, the user can also approach a commercial store outfitted with the disclosed embodiments, and scan his or her MRC 3402. The store-based computer can then provide the presentation of personal account information, and the further linking to vendor web sites for display of product information via the account information. For example, the user can present their card or personal access device to a kiosk. At the kiosk, an automatic reader could be provided which merely requires one to hold their personal access device or credit card under a scanner, or a separate hand-held scanner could be provided. In any event, it is only necessary to input this code to the kiosk. Once the unique code is entered into the kiosk, one of two things can happen. The first is that their personal account information will be immediately displayed on a display associated with the kiosk. The second is that a PIN may be required to be input prior to the information being returned. In the first situation, the user will be connected directly to the credit card server 3300 via the GCN 306.

The credit card server 3300 recognizes the user by two methods. The first is that the unique code is actually a pointer directly to a predetermined page within the credit card server 3300. This merely requires the unique code to be associated in a relational database somewhere, either at the local computer 302 or the remote server 3300, to an address pointer which points to the particular page on the server 3300. In this way, the relational database is required to contain all of the information regarding the location of the location of the user. Alternatively, the local database 1614 or the remote intermediate database 3302 only contains information regarding the location of the credit card server 3300 on the GCN 306. Once this location is determined, then the unique code (which was utilized to determine the network address of the credit card server 3300 and constitutes a "unique commerce code") is then transmitted to the credit card server 3300 as a personal access code. The credit card server 3300 then recognizes that this is a valid access code existing in a database 3302 local to the server 3300, and then the server 3300 interfaced with the user accordingly, either by immediately returning personal information or by requesting a PIN, as described hereinabove. The personal information comprises linkable icons in association with the one or more line-item transactions of products allowing the user to then access a web site of a respective vendor of a product corresponding to a line-item transaction. In this manner, the unique commerce code functions to both define the location of the credit card server or the network and to define the user to the credit card server. Alternately, the intermediate server could return information from database associated with the user that defines the user. This could be any form of user ID disposed on the credit card or in the database 3202. Thus, the information or unique commerce code contains both routing information and identification information in either a single field or two fields.

Although the preferred embodiment has been described in detail, it should be understood that various changes, substitutions and alterations can be made therein without departing from the spirit and scope of the invention as defined by the appended claims.

What is claimed is:

1. A method of accessing a vendor web site disposed on a network at the vendor location thereon using personal account information of a user retrieved from a credit card company server disposed on the network at a credit card location thereon, comprising the steps of:

at a user location disposed on the network, reading a machine-resolvable code (MRC) on a credit card of the user with a reading device, which credit card was issued by the credit card company;

extracting coded information from the MRC;

obtaining routing information associated with the coded information, which routing information corresponds to the personal account information of the user stored on the credit card company server disposed on the network;

connecting the user location to the credit card company server across the network in accordance with the routing information;

returning the personal account information from the credit card company server to the user location in response to the step of extracting, which returned personal account information contains routing information relating to vendors that previously had been commercially related with the user;

presenting the personal account information to the user at the user location;

providing a hyperlink to a web site of a vendor in the personal account information for automatic connection of the user location to the vendor web site in response to the selection thereof by a user in a selection operation; and completing a financial transaction with the selected vendor in the selection operation to make a purchase, and utilizing the connection to the credit card server made in the step of connecting the user location to the credit card company to add purchases to the credit card account associated with the credit card of the user.

2. The method of claim 1, wherein the MRC is optical indicia.

3. The method of claim 2, wherein the optical indicia is a bar code.

4. The method of claim 1, wherein the routing information in the step of obtaining is stored on a user computer at the user location such that the coded information in the step of extracting is used to obtain the corresponding routing information from the user computer.

5. The method of claim 4, wherein the user computer stores a plurality of coded information each associated with unique routing information such that reading of the MRC of a select one of one or more credit cards of the user causes the user computer to connect to the corresponding credit card company server over the network.

6. The method of claim 1, wherein the reading device is a wireless scanner which transmits the coded information to a user computer at the user location via a receiving device operatively connected to the user computer.

7. The method of claim 1, wherein personal account information in the step of presenting is displayed on a computer display operatively connected to a user computer at the user location.

8. The method of claim 1, wherein the routing information in the step of obtaining comprises a network address of the credit card company server on the network and file path information which locates the personal account information of the user on the credit card company server.

9. The method of claim 1, wherein the hyperlink is associated with a line item transaction of the personal account information such that the purchased product associated with the line item transaction is a select one of one or more products of the vendor of the web site which are available for purchase.

10. The method of claim 1, wherein the hyperlink is associated with a line item transaction of the personal account information such that the purchased product associated with the line item transaction is unrelated to product information of one or more products of the vendor of the web site which are available for purchase and to which the hyperlink is associated.

11. A system of accessing a vendor web site on a network using personal credit card account information retrieved from a credit card company server disposed on the network, comprising:

a machine-resolvable code (MRC) on a credit card of a user issued to the user by the credit card company, wherein said MRC is read with a reading device at a user location of said user, said user location disposed on the network, and coded information of said MRC extracted therefrom;

routing information associated with said coded information, which said routing information corresponds to the personal account information of said user stored on the credit card company server;

wherein the user location is connected to the credit card company server across the network via a credit card company connection in response to the reading of the MRC in accordance with said routing information, and the personal account information returned from the credit card company server to said user location is presented to said user at said user location, which returned personal account information contains as a portion thereof routing information relating to vendors that previously had been commercially related with by the user; and a hyperlink to a web site of a vendor provided in association with the personal account information for automatically connecting said user location to said web site in response to the selection thereof by the user;

wherein a user can complete a financial transaction with the hyperlinked vendor to make a purchase and use the credit card company connection to the credit card server to add purchases to the credit card account associated with the credit card.

12. The system of claim 11, wherein said MRC is optical indicia.

13. The system of claim 12, wherein said optical indicia is a bar code.

14. The system of claim 11, wherein said routing information is stored on a user computer at said user location such that said coded information is used to obtain the corresponding said routing information from said user computer.

15. The system of claim 14, wherein said user computer stores a plurality of said coded information each associated with unique said routing information such that reading of said MRC of a select one of the one or more credit cards of said user causes said user computer to connect to the corresponding credit card company server over the network.

16. The system of claim 11, wherein said reading device is a wireless scanner which transmits said coded information to a user computer via a receiving device operatively connected to said user computer.

17. The system of claim 11, wherein personal account information is displayed on a computer display operatively connected to a user computer at said user location.

18. The system of claim 11, wherein said routing information comprises a network address of the credit card company server on the network and file path information which locates the personal account information of said user on the credit card company server.

19. The system of claim 11, wherein said hyperlink is associated with a line item transaction of the personal account information such that said purchased product associated with said line item transaction is a product available for purchase from said vendor web site.

20. The system of claim 11, wherein said hyperlink is associated with a line item transaction of the personal account information such that said purchased product associated with said line item transaction is unrelated to product information of one or more products of said vendor of the web site which are available for purchase and to which said hyperlink is associated.

* * * * *